(12) United States Patent
Mizusaki

(10) Patent No.: US 9,122,103 B2
(45) Date of Patent: Sep. 1, 2015

(54) LIQUID-CRYSTAL DISPLAY DEVICE, PROCESS FOR PRODUCING LIQUID-CRYSTAL DISPLAY DEVICE, AND COMPOSITION FOR FORMING ALIGNMENT FILM

(75) Inventor: Masanobu Mizusaki, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 243 days.

(21) Appl. No.: 13/579,460

(22) PCT Filed: Dec. 1, 2010

(86) PCT No.: PCT/JP2010/071445
§ 371 (c)(1),
(2), (4) Date: Aug. 16, 2012

(87) PCT Pub. No.: WO2011/102041
PCT Pub. Date: Aug. 25, 2011

(65) Prior Publication Data
US 2012/0314166 A1 Dec. 13, 2012

(30) Foreign Application Priority Data
Feb. 18, 2010 (JP) ................................ 2010-034011

(51) Int. Cl.
*G02F 1/1337* (2006.01)
(52) U.S. Cl.
CPC ..... *G02F 1/133711* (2013.01); *B32B 2457/202* (2013.01); *Y10T 428/1005* (2015.01); *Y10T 428/1018* (2015.01); *Y10T 428/1023* (2015.01)
(58) Field of Classification Search
CPC ............ G02F 1/1337; G02F 1/133711; G02F 1/133362; G02F 1/133723; G02F 1/133788; G02F 1/133746; G02F 2001/133757; C09K 19/56; C08G 69/44

USPC ................................... 428/1.2; 349/123–124
See application file for complete search history.

(56) References Cited

U.S. PATENT DOCUMENTS 6,633,356 B1 10/2003 Kataoka et al.
2002/0135725 A1 9/2002 Terashita et al.
(Continued)

FOREIGN PATENT DOCUMENTS

JP 2000-122065 4/2000
JP 2002-277877 9/2002
(Continued)

OTHER PUBLICATIONS

What is TFT LCD TV and LCD Monitor Panel?, Samsung Electronics, Oct. 21, 2014.*
(Continued)

*Primary Examiner* — Sophie Hon
(74) *Attorney, Agent, or Firm* — Nixon & Vanderhye P.C.

(57) ABSTRACT

The present invention provides a liquid-crystal display device that can efficiently provide both effects of improvement in a response time and suppression of image sticking in a display screen. The liquid-crystal display device according to the present invention is a liquid-crystal display device including a pair of substrates each including an electrode and an alignment film and a liquid crystal layer interposed between the pair of substrates, wherein the alignment film comprises a copolymer comprising a first monomer unit including a first side chain including a photoreactive functional group and a second monomer unit including a second side chain including a repeated structure.

2 Claims, 6 Drawing Sheets

(56) References Cited

U.S. PATENT DOCUMENTS

| | | | |
|---|---|---|---|
| 2004/0130253 A1* | 7/2004 | Ohsaki et al. | 313/110 |
| 2004/0138394 A1 | 7/2004 | Buchecker et al. | |
| 2005/0117100 A1 | 6/2005 | Terashita et al. | |
| 2006/0203167 A1 | 9/2006 | Terashita et al. | |
| 2009/0146105 A1 | 6/2009 | Oh et al. | |
| 2010/0085523 A1* | 4/2010 | Terashita et al. | 349/123 |

FOREIGN PATENT DOCUMENTS

| | | | |
|---|---|---|---|
| JP | 2004-530734 | 10/2004 | |
| JP | 2006-085204 | 3/2006 | |
| JP | 2009/139957 | 6/2009 | |
| JP | 2010-107537 | 5/2010 | |
| WO | WO 2008/078629 | 7/2008 | |
| WO | WO 2008078629 A1 * | 7/2008 | G02F 1/1337 |
| WO | WO 2008/117615 | 10/2008 | |
| WO | WO 2008117615 A1 * | 10/2008 | |

OTHER PUBLICATIONS

International Search Report for PCT/JP2010/071445 mailed Mar. 8, 2011.
S. Kim, et al., "New Technologies for Advanced LCD-TV Performance", Journal of the SID, 2004, vol. 12, No. 4, pp. 353-358.

* cited by examiner

LIQUID-CRYSTAL DISPLAY DEVICE, PROCESS FOR PRODUCING LIQUID-CRYSTAL DISPLAY DEVICE, AND COMPOSITION FOR FORMING ALIGNMENT FILM

This application is the U.S. national phase of International Application No. PCT/JP2010/071445 filed 1 Dec. 2010 which designated the U.S. and claims priority to JP 2010-034011 filed 18 Feb. 2010, the entire contents of each of which are hereby incorporated by reference.

TECHNICAL FIELD

The present invention relates to a liquid-crystal display device, a process for producing a liquid-crystal display device, and a composition for forming an alignment film. More specifically, the present invention relates to a liquid-crystal display device in which the alignment orientation of liquid crystal molecules is regulated by a photoalignment treatment, a process for producing the liquid-crystal display device, and a composition for forming an alignment film suitably used for these.

BACKGROUND ART

Liquid-crystal display devices are widely used as display devices for televisions, personal computers, and PDAs because these have a thin profile, a light weight, and low power consumption. Particularly, recently, enlarging of the size of the liquid-crystal display device has been rapidly progressed as shown in liquid-crystal display devices for television, for example. For the enlarging of the size, a vertical alignment mode (VA) is suitably used in which a liquid-crystal display device having a large area can be produced at a higher yield, and a wide viewing angle is provided. In the vertical alignment mode, when no voltage is applied within a liquid crystal layer, liquid crystal molecules are aligned orthogonal to the surface of a substrate. Thereby, a high contrast ratio can be obtained.

As an example of application of the vertical alignment mode, for example, a method is disclosed in which a protrusion (rib) is formed in a surface facing a liquid crystal layer to give a pretilt angle to liquid crystal molecules in the vicinity of the rib, and voltage is applied to control the orientation of the liquid crystal molecules when the liquid crystal molecules are horizontally aligned to secure a wide viewing angle (for example, see Patent Literature 1.). Other method is known in which a slit is provided in a display electrode to generate an inclined electric field region, thereby to control the horizontal alignment orientation of liquid crystal molecules (for example, see Non-Patent Literature 1.).

Unfortunately, the method using the rib or the electrode slit is susceptible to improvement because not the whole surface of pixels is subjected to the pretilt aligning treatment, most of the pixel region has the pretilt angle of 90°, and the response time is slow. Then, a method is disclosed in which an alignment film is rubbed in four directions to divide pixels into four domains; thereby, the pretilt angle of liquid crystal molecules in a whole pixel region is approximately 88° (for example, see Patent Literature 2.). Other method is disclosed in which an alignment division is performed by a photoalignment method to give substantially the same pretilt angle as that in the method above to liquid crystal molecules (for example, see Patent Literature 3.).

Thereby, the pretilt angle can be given to the liquid crystal molecules in the whole pixel region to improve the response time. Unfortunately, in these methods, display of the same pattern for a long time may cause "image sticking" in the display. As a countermeasure, a method for suppressing occurrence of image sticking is disclosed in which an alignment film is formed using a polymer material including a side chain including a predetermined or more weight average molecular weight to the molecular weight of liquid crystal molecules (for example, see Patent Literature 4.).

CITATION LIST

Patent Literature

Patent Literature 1: JP2000-122065A
Patent Literature 2: JP2002-277877A
Patent Literature 3: JP2006-85204A
Patent Literature 4: WO 2008/078629

Non Patent Literature

Non Patent Literature 1: Sang Soo Kim, et al., (New technologies for advanced LCD-TV performance)," (J. SID), US, 2004, vol. 12, No. 4, pp. 353-359

SUMMARY OF INVENTION

Technical Problem

The present inventor studied display properties in the VA mode in various ways, and found out that response takes a time in the conventional VA mode for the following reason: when vertical aligned liquid crystal molecules (directors) are tilted in the horizontal direction to the surface of a substrate by application of voltage, the liquid crystal molecules are twisted for a moment and then, tilted in an orientation in which the liquid crystal molecules should be tilted, but not tilted in that orientation immediately after the application of voltage. FIG. 5 is a graph showing change in an azimuthal angle of the directors when voltage is applied in the conventional VA mode. Apparently from the graph in FIG. 5, the directors are largely twisted once after white display voltage is applied (0.7 ms later or 1.0 ms later), and settle in the orientation in which the directors should be tilted. It is thought that such a phenomenon occurs because no anchoring strength in orientation angle direction to the liquid crystal molecules exists in the vertical alignment mode.

Moreover, occurrence of the image sticking within a display screen when applied voltage in the display device still remains unsolved.

Further, the present inventor extensively studied the method for regulating the direction of directors by an alignment film, subjected to a photoalignment treatment, and found out that a sufficient effect cannot be obtained only by the method as described in Patent Literature 4 in which a photoreactive functional group is contained in a side chain including a repeated structure, unless the amount of light for irradiation in the photoalignment treatment to give a predetermined pretilt angle and orientation is increased.

The present invention has been made in consideration of the circumstances above. An object of the present invention is to provide a liquid-crystal display device that can efficiently provide both effects of improvement in a response time and suppression of image sticking in a display screen, a process for producing such a liquid-crystal display device, and a composition for forming an alignment film suitably used for these.

Solution to Problem

First, the mechanism how the "image sticking" occurs in the display screen in the liquid-crystal display device will be described. Two factors will be shown: (1) DC offset voltage is generated within a cell, and even if a voltage is applied from the outside, the DC offset voltage produces a different alignment of the liquid crystal molecules, and (2) although no DC offset voltage is generated, the alignment of the liquid crystal molecules existing in the vicinity of the alignment film is changed by AC voltage drive. Particularly, with respect to the factor (2), the conventional vertical alignment film has low anchoring strength in a polar angle direction. For this, the liquid crystal molecules in the vicinity of the alignment film response to application of voltage irrespective of the structure of the alignment film, and the structure of the alignment film is also changed along with the movement of the liquid crystal molecules. Immediately after the drive voltage is changed, the liquid crystal molecules in the vicinity of the alignment film cannot be instantly relaxed, resulting in the image sticking. Hereinafter, the detail will be described using the drawings.

FIGS. 6 to 8 are conceptual drawings showing a principle how the "image sticking" occurs due to low polar angle anchoring strength in the case where the vertical alignment film is used. FIG. 6 shows a state before voltage is applied, FIG. 7 shows a state after voltage is applied, and FIG. 8 shows a state when the electric field is switched to 0 ($V/m^2$) again. As shown in FIG. 6, before voltage is applied, usually, liquid crystal molecules 102 within a liquid crystal layer 105 provided between a pair of substrates 101 have a predetermined pretilt, and are aligned vertically to the surface of the substrate 101. Each of electrodes 104 forming a pair is formed on the surface of the substrate 101 on the side of the liquid crystal layer 105. Each of alignment films 103 forming a pair is formed on the surface of the electrode 104 on the side of the liquid crystal layer 105. The alignment film 103 is formed with a polymer, which includes a main chain 103a and a side chain 103b. At this time, it is thought that the liquid crystal molecules 102 existing in the vicinity of the alignment film 103 enter gaps between the side chains 103b of the polymer. When a predetermined voltage is applied to such a liquid crystal layer 105, the liquid crystal molecules 102 are tilted in a direction horizontal to the surface of the substrate 101. As shown in FIG. 7, if the polar angle anchoring strength of the alignment film 103 is low, the liquid crystal molecules 102 existing in the vicinity of the alignment film 103 are horizontally aligned. Additionally, change in the alignment of the liquid crystal molecules 102 causes the side chains 103b of the polymer that forms the alignment film 103 to be tilted in the horizontal direction following the liquid crystal molecules 102. Then, as shown FIG. 8, when the electric field is switched to 0 ($V/m^2$) again, the liquid crystal molecules 102 in the central portion of the liquid crystal layer 105 can response instantly while the liquid crystal molecules 102 in the vicinity of the alignment film 103 take some times to response by an influence of the side chains 103b of the polymer of the alignment film 103. As a result, an afterimage (image sticking) is produced in the display even if no DC offset voltage is generated.

As a countermeasure against this, a material for an alignment film having a large weight average molecular weight of the side chain is used to increase the polar angle anchoring strength of the alignment film. Thereby, when voltage is applied, the liquid crystal molecules in the vicinity of the alignment film can be fixed to remain vertical to the surface of the substrate. This can prevent the side chains of the polymer that forms the alignment film from being tilted in a direction horizontal to the surface of the substrate, resulting in improvement in the response time and suppression of occurrence of the image sticking. The details will be described using the drawings below.

FIGS. 9 to 11 are conceptual drawing showing a principle how the image sticking is suppressed by high polar angle anchoring strength in the case where a vertical alignment film is used. FIG. 9 shows a state before voltage is applied, FIG. 10 shows a state after voltage is applied, and FIG. 11 shows a state when the electric field is switched to 0 ($V/m^2$) again. As shown in FIG. 9, before voltage is applied, usually, liquid crystal molecules 202 in the liquid crystal layer 205 provided between a pair of substrates 201, and are aligned at a predetermined pretilt in a direction vertical to the surface of the substrate 101, as in the case of FIG. 6. According to the configuration of the present invention, even if a predetermined voltage is applied to such a liquid crystal layer 205, high polar angle anchoring strength of the alignment film 203 prevents the liquid crystal molecules 202 existing in the vicinity of the alignment film 203 from being horizontally aligned. Thereby, as shown in FIG. 10, the liquid crystal molecules 202 existing in the vicinity of the alignment film 203 remain vertically aligned. Accordingly, change in the alignment of the liquid crystal molecules 202 causes no horizontal tilt of the side chains 203c of the polymer that forms the alignment film 203. As a result, as shown in FIG. 11, when the electric field is switched to 0 ($V/m^2$) again, the liquid crystal molecules 202 in the vicinity of the alignment film 203 can response instantly, preventing the afterimage (image sticking).

Under such an idea, the present inventor focused on the polar angle anchoring strength particularly when an aligning treatment by irradiation with light was performed. The aligning treatment by irradiation with light can be performed no contact treatment such as rubbing, and reduce possibility of damages of a structure under the alignment film (for example, a thin film transistor).

Moreover, as a result of detailed research by the present inventor, it was clarified that the photoalignment treatment is not efficiently performed only by providing a structure in which a group of atoms comprising a photoreactive functional group that initiates the reaction by the photoalignment treatment and a group of atoms having a predetermined number of repetition in order to provide a sufficient weight average molecular weight of the side chain are included in the same side chain; therefore, throughput is reduced.

In order to solve the problem, as a result of extensive research by the present inventor, it was found out that in a polymer material that forms an alignment film, a monomer unit for demonstrating the alignment orientation and pretilt angle of liquid crystal molecules is prepared beside a monomer unit for ensuring a sufficient weight average molecular weight of the side chain, and these are copolymerized; thereby, a function to control alignment of the liquid crystal molecules and stabilization of the alignment of the liquid crystal molecules in the vicinity of the interface can be efficiently attained. Thus, the present inventor achieved the solution to the problems above, and has made the present invention.

Namely, the present invention is a liquid-crystal display device including a pair of substrates including an electrode and an alignment film, and a liquid crystal layer interposed between the pair of substrates, wherein the alignment film comprises a copolymer comprising a first monomer unit including a first side chain including a photoreactive functional group and a second monomer unit including a second side chain including a repeated structure.

The liquid-crystal display device according to the present invention includes a pair of substrates including an electrode and an alignment film, and a liquid crystal layer interposed between the pair of substrates. In the present invention, the electrode and the alignment film are provided each of the substrates in the pair. Because each of the substrates in the pair comprises an electrode, voltage can be easily applied to the inside of the liquid crystal layer. The alignment film is provided on each of the electrodes to regulate the alignment orientation and pretilt angle of the liquid crystal molecules in the vicinity of the alignment film. The pair of substrates is composed of an active matrix substrate and a color filter substrate, for example.

The alignment film comprises a copolymer comprising a first monomer unit including a first side chain including a photoreactive functional group and a second monomer unit including a second side chain including a repeated structure. If the photoreactive functional group is incorporated into the side chain, alignment orientation and pretilt angle of the liquid crystal molecules can be controlled only by adjusting irradiation with light. If the repeated structure is incorporated into the side chain, the weight average molecular weight of the side chain can be easily increased to enhance the anchoring strength.

In the present invention, a polymer compound used for a material for the alignment film is produced from a first monomer that mainly demonstrates the alignment orientation and pretilt angle of the liquid crystal molecules, and a second monomer that mainly enhances the polar angle anchoring strength to the liquid crystal molecules. If a copolymer is obtained from these monomers, an alignment film that has photoalignment properties and reduces the image sticking can be efficiently obtained. If the material for the alignment film comprises a homopolymer and the number of the repeated structure is excessively increased, the pretilt angle of liquid crystal molecules in the vicinity of the alignment film may be close to 90°, and a good response time may not be obtained. Meanwhile, according to the present invention, the material for the alignment film comprises the copolymer. For this, stabilization of the alignment of the liquid crystal molecules and demonstration of the alignment orientation and pretilt angle of the liquid crystal molecules can be independently controlled. Accordingly, both the effect of reducing the image sticking and the effect of accelerating the response time are more likely to be obtained than in the case of the alignment film comprising a homopolymer.

Thus, the liquid-crystal display device according to the present invention is a liquid-crystal display device of a type in which alignment properties of liquid crystal molecules are regulated by the photoalignment treatment. The liquid-crystal display device according to the present invention may include other configuration as long as the configuration above is essential. For example, the liquid-crystal display device according to the present invention may further include a retardation film and a polarizer. Moreover, a slit may be formed on the electrode included in each or both of the substrates in the pair.

A preferred embodiment of the liquid-crystal display device according to the present invention will be described more in detail below.

In the alignment film, the liquid crystal molecules in the vicinity of the alignment film are preferably aligned at an angle of not less than 86° and less than 90° to the surface of the alignment film. Because the alignment film has such a property, the liquid-crystal display device according to the present invention can be formed as a VA mode liquid-crystal display device. Additionally, because the liquid crystal molecules in the vicinity of the alignment film are tilted at a predetermined angle to 90° and kept, the response time improves. In this case, liquid crystal molecules showing negative dielectric anisotropy are used in the material for a liquid crystal layer.

Preferably, the photoreactive functional group is at least one functional group selected from the group consisting of a cinnamate group, a coumarin group, a chalcone group, a tolan group, and an azobenzene group. These photoreactive functional groups can be relatively easily formed in the side chain of the polymer, and have high reactivity in the photoalignment treatment.

The weight average molecular weight of the second side chain is preferably not less than 1000. At a weight average molecular weight less than 1000, a sufficient anchoring effect of the liquid crystal molecules may not be obtained.

The repeated structure preferably includes at least one group of atoms (hereinafter, also referred to as a repeated unit in some cases.) selected from the group consisting of the following formulas (1-1) to (1-16):

[Chem. 1]

(1-1)

(1-2)

(1-3)

(1-4)

(1-5)

(1-6)

(1-7)

(1-8)

(1-9)

(1-10)

(1-11)

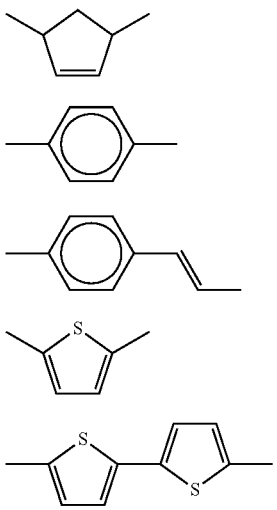

These are suitable structures as the repeated unit.

The second side chain preferably contains a group of atoms that forms a crosslinking structure by a photoreaction. If such a crosslinkable structure is added to the second side chain, a crosslinking structure can also be formed between the second side chains. Thereby, the alignment of the liquid crystal molecules is further stabilized to improve the image sticking properties and the response properties. The photoreactive functional group included in the second side chain is for stabilization of alignment (improvement of the image sticking and the response) while the photoreactive functional group included in the first side chain is for control of the alignment of the liquid crystal molecules (control of the azimuthal angle and the tilt angle). For this reason, the photoreactive functional group that the first side chain includes and the photoreactive functional group that the second side chain includes may not be always the same, and may be different from each other.

The group of atoms that forms a crosslinking structure by the photoreaction is preferably at least one group of atoms selected from the group consisting of a cinnamate group, a coumarin group, a chalcone group, a diphenylethylene group, a tolan group, and an azobenzene group. These groups of atoms can be relatively easily formed in the side chain of the polymer, and have high reactivity in the photoalignment treatment.

The copolymer is preferably polyimides, polyamic acids, polyamides, polysiloxanes, or polyvinyls. These are polymers that can be effectively used as the alignment film.

Preferably, the liquid-crystal display device comprises a plurality of pixel regions, and a liquid crystal domain corresponding to each of the pixel regions in the liquid crystal layer is divided into multi-domains each having a different reference alignment orientation of the liquid crystal molecule. An inside of one pixel region is divided and formed into a plurality of domains each having a different alignment orientation of the liquid crystal molecule in the liquid crystal layer. Thereby, similar viewing can be ensured even if the display screen is viewed from different angles, leading to improved viewing angle characteristics.

The number of the multi-domains is preferably four. Division into four provides a good balance when the viewing angle is tilted in any direction of up, down, left, and right to the normal direction of the display screen, leading to improved viewing angle characteristics.

The present invention is also a process for producing a liquid-crystal display device each including a pair of substrates including an electrode and alignment film and a liquid crystal layer interposed between the pair of substrates, the process comprising the steps of: copolymerizing a first monomer unit including a first side chain including a photoreactive functional group and a second monomer unit including a second side chain including a repeated structure to form an alignment film, and irradiating the alignment film with light to perform an aligning treatment.

If the photoreactive functional group is incorporated into the side chain, the alignment orientation and pretilt angle of the liquid crystal molecules can be controlled only by adjusting irradiation with light. Moreover, if the repeated structure is incorporated into the side chain, the weight average molecular weight of the side chain can be easily increased to enhance the anchoring strength.

In the production process according to the present invention, a polymer compound used as a material for an alignment film is produced from a first monomer that can mainly demonstrate the alignment orientation and pretilt angle of the liquid crystal molecules, and a second monomer that can mainly enhance the polar angle anchoring strength to the liquid crystal molecule. If a copolymer is obtained from these monomers, an alignment film that has photoalignment properties, and reduce the image sticking can be efficiently formed.

Preferable embodiments of the process for producing the liquid-crystal display device of the present invention are mentioned in more detail below.

The light used for irradiation of the alignment film is preferably linearly polarized UV light, elliptically polarized UV light, circularly polarized UV light, or non-polarized UV light. The UV light above has advantages in the reactivity and the ability to align the liquid crystal molecules.

Preferably, in the alignment film, the liquid crystal molecules in the vicinity of the alignment film are vertically aligned before the irradiation with the light. If the alignment film has such properties, the liquid-crystal display device according to the present invention can be provided as a VA mode liquid-crystal display device. In this case, the production process preferably comprises the step of filling liquid crystal molecules showing negative dielectric anisotropy as a material for the liquid crystal layer.

The step of performing the aligning treatment is preferably a step of irradiating the alignment film with light such that the liquid crystal molecules in the vicinity of the alignment film are tilted at an angel of not less than 86° and less than 90° to the surface of the alignment film. Thereby, the liquid crystal molecule are tilted at a predetermined angle to 90° and kept to improve the response time.

The photoreactive functional group is preferably at least one functional group selected from a cinnamate group, a coumarin group, a chalcone group, a tolan group, and an azobenzene group. These photoreactive functional groups can be relatively easily formed in the side chain of the polymer, and have a high reactivity in the photoalignment treatment.

The weight average molecular weight of the second side chain is preferably not less than 1000. At a weight average molecular weight less than 1000, a sufficient anchoring effect of the liquid crystal molecules may not be obtained.

The second side chain preferably contains a group of atoms that forms a crosslinking structure by a photoreaction. If the second side chain includes a crosslinking structure, the anchoring strength can be further enhanced to enhance alignment stability of the liquid crystal molecules in the vicinity of the alignment film.

The group of atoms that forms a crosslinking structure by a photoreaction is preferably at least one group of atoms selected from the group consisting of a cinnamate group, a coumarin group, a chalcone group, a tolan group, and an azobenzene group. As described above, these groups of atoms can be relatively easily formed in the side chain of the polymer, and have a high reactivity in the photoalignment treatment.

The macromolecular main chain of the copolymer is preferably polyimides, polyamic acids, polyamides, polysiloxanes, or polyvinyls. These are polymers that can be effectively used as the alignment film.

The liquid-crystal display device comprises a plurality of pixel regions. In the step of irradiating the alignment film with light, a liquid crystal domain corresponding to each of the pixel regions in the liquid crystal layer is preferably divided into multi-domains each having a different reference alignment orientation of the liquid crystal molecule. An inside of one pixel region is subjected to the aligning treatment (domain division) on a plurality of different conditions in irradiation with light. Thereby, a plurality of divided domains each having a different reference alignment orientation of the liquid crystal molecule in the liquid crystal layer can be formed within the one pixel region. Thereby, similar viewing can be ensured even if the display screen is viewed from different angles, leading to improved viewing angle characteristics.

The direction of irradiating with light is preferably four directions. By dividing the liquid crystal domain per pixel into four, a good balance is provided when the viewing angle is tilted in any direction of up, down, left, and right to the normal direction of the display screen, leading to improved viewing angle characteristics.

Further, the present invention is a composition for forming an alignment film comprising a copolymer comprising a first monomer unit including a first side chain including a photoreactive functional group and a second monomer unit including a second side chain including a repeated structure, wherein the weight average molecular weight of the second side chain is not less than 1000.

If the photoreactive functional group is incorporated into the side chain, the alignment orientation and pretilt angle of the liquid crystal molecules can be controlled only by adjusting irradiation with light. Moreover, if the repeated structure is incorporated into the side chain, the weight average molecular weight of the side chain can be easily increased to enhance the anchoring strength.

Thus, the liquid-crystal display device produced by the production process according to the present invention is a liquid-crystal display device of a type in which the alignment properties of the liquid crystal molecules are regulated by the photoalignment treatment. The liquid-crystal display device according to the present invention may include other configuration as long as such a configuration is essential. For example, the liquid-crystal display device according to the present invention may further include a retardation film and a polarizer. Moreover, a slit may be formed on the electrode included in each or both of the substrates in the pair.

A polymer compound that forms the composition for forming an alignment film according to the present invention is produced from a first monomer that mainly demonstrates the alignment orientation and pretilt angle of the liquid crystal molecules, and a second monomer that mainly enhances the polar angle anchoring strength to the liquid crystal molecule.

If a copolymer is obtained from these monomers, an alignment film that has photoalignment properties, and reduces the image sticking can be efficiently formed.

Moreover, because the weight average molecular weight of the second side chain is not less than 1000, a sufficient anchoring effect can be given to the liquid crystal molecules.

The repeated structure preferably includes at least one group of atoms selected from the group consisting of the following formulas (1-1) to (1-16):

[Chem. 2]

(1-1)

(1-2)

(1-3)

(1-4)

(1-5)

(1-6)

(1-7)

(1-8)

(1-9)

(1-10)

(1-11)

(1-12)

(1-13)

(1-14)

-continued

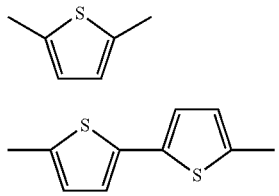

(1-15)

(1-16)

These are suitable structures as the repeated unit.

Advantageous Effects of Invention

According to the present invention, a liquid-crystal display device comprising an alignment film can be provided, the alignment film being capable of improving the response time and reducing the occurrence of the image sticking, and having a high photoreactivity.

DESCRIPTION OF EMBODIMENTS

Figure 1:
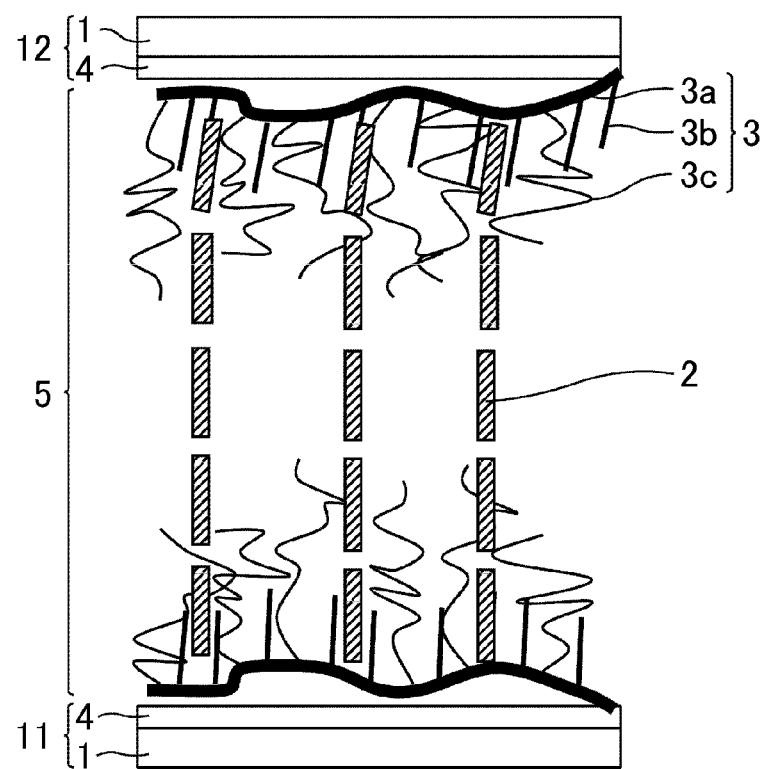
FIG. 1 is a conceptual drawing showing a characteristic of a liquid-crystal display device according to Embodiment 1.

The present invention will be mentioned in more detail referring to the drawings in the following embodiments, but is not limited to these embodiments.

Embodiment 1

Embodiment 1 is an example of a liquid-crystal display device according to the present invention and a liquid-crystal display device produced by the production process according to the present invention using a composition for forming an alignment film according to the present invention. FIG. 1 is a conceptual drawing showing a characteristic of the liquid-crystal display device according to Embodiment 1. As shown in FIG. 1, the liquid-crystal display device according to Embodiment 1 includes a liquid crystal layer 5, and a pair of substrates 11 and 12, the liquid crystal layer 5 being interposed therebetween. Each of the substrates 11 and 12 in the pair comprises a support 1 made of glass or the like as a base, and comprises an electrode 4 on the surface of the support 1 on the side of the liquid crystal layer 5. Accordingly, the liquid crystal layer 5 is located between the pair of the electrodes 4, which apply a predetermined voltage to the inside of the liquid crystal layer 5. The voltage can be applied to the inside of the liquid crystal layer 5 to give liquid crystal molecules 2 alignment properties different from those before the voltage is applied. Thereby, the polarization state of the light that transmits through the liquid crystal layer 5 can be changed.

Each of the substrates 11 and 12 in the pair comprises an alignment film 3 on the surface of the electrode 4 on the side of the liquid crystal layer 5. Thereby, the liquid crystal molecules 2 are arranged in a predetermined direction even when no voltage is applied to the liquid crystal layer 5. In Embodiment 1, the alignment film 3 can give a pretilt angle of not less than 86° and less than 90° to the liquid crystal molecules 2.

In Embodiment 1, the alignment film 3 is formed with a polymer compound comprising a main chain 3a, a first side chain 3b including a photoreaction group, and a second side chain 3c including a repeated structure (hereinafter, also referred to as a grafted side chain in some cases.). The grafted side chain 3c includes a repeated structure, and has a weight average molecular weight larger than that of the first side chain 3b. For this, the grafted side chain 3c is a side chain longer than the first side chain 3b as shown in FIG. 1.

One of the substrates in the pair is an active matrix substrate 11, and the other thereof is a color filter substrate 12. The active matrix substrate 11 can be produced by providing a variety of wirings such as a signal line, a scanning line, and a storage capacitor wiring and an active element such as a thin film transistor (TFT) on the support 1. A plurality of pixel electrodes can be provided at a predetermined interval to control drive for each pixel region. Thereby, the entire liquid crystal display is controlled. The color filter substrate 12 can be produced by providing a color filter for coloring light R (red), G (green), or B (blue) and a black matrix for shielding the light on the support 1. The color filter and the black matrix may be provided on the side of the active matrix substrate but not on the side of the color filter substrate.

A liquid crystal material having negative dielectric anisotropy is used for the liquid crystal layer 5. By the influence of the alignment film 3, the liquid crystal molecules 2 have alignment properties in a direction vertical to the surface of the support 1 when no voltage is applied, and are tilted in a direction horizontal to the surface of the support 1 when voltage is applied. Accordingly, the liquid-crystal display device according to Embodiment 1 is an embodiment of the VA mode.

Each of the substrates 11 and 12 in the pair comprises a polarizer. Each of the polarizers in the pair is provided on the surface of the support 1 on the side opposite to the liquid crystal layer 5. The polarizers in the pair are disposed in the so-called cross-Nicol state in which a polarization axis of one polarizer crosses that of the other polarizer. Accordingly, the liquid-crystal display device according to Embodiment 1 is an embodiment of a normally black mode, provides a black display (falls) when no voltage is applied, and provides a white display (rises) when voltage is applied.

Figure 2:
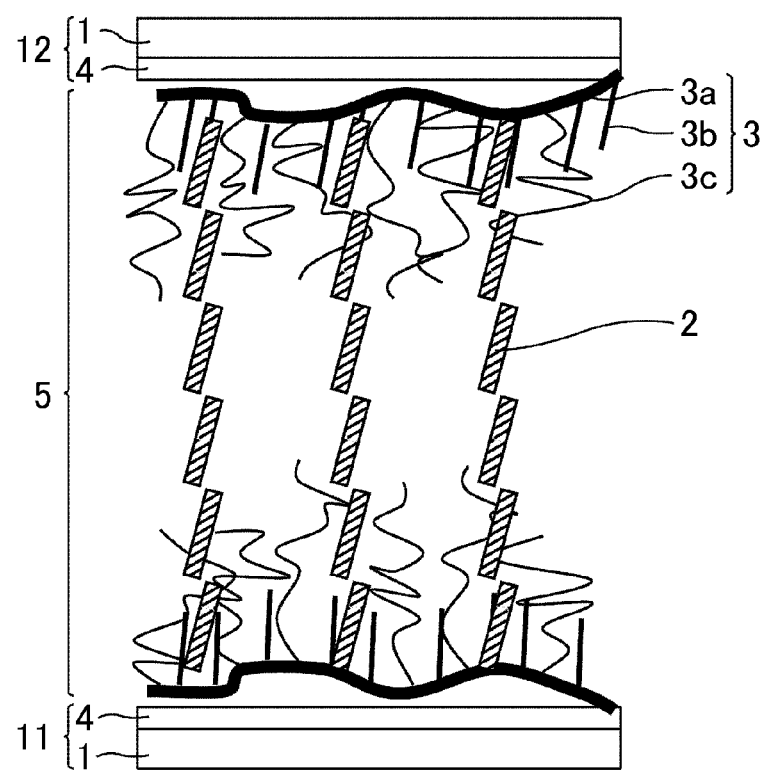
FIG. 2 is a conceptual drawing showing a principle how an alignment film according to Embodiment 1 reduces image sticking, and showing a state before voltage is applied.
Figure 3:
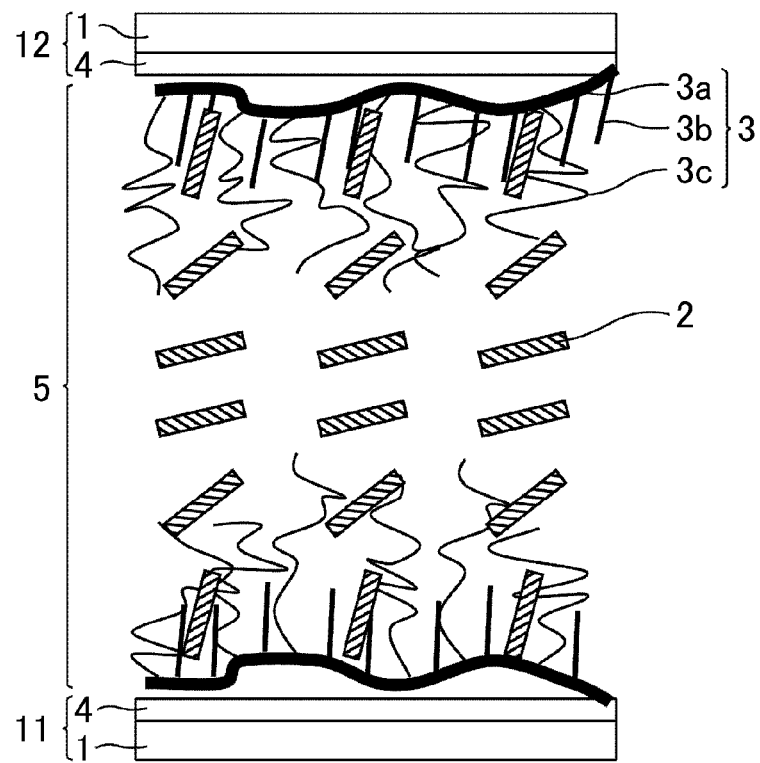
FIG. 3 is a conceptual drawing showing a principle how an alignment film according to Embodiment 1 reduces image sticking, and showing an embodiment after voltage is applied.
Figure 4:
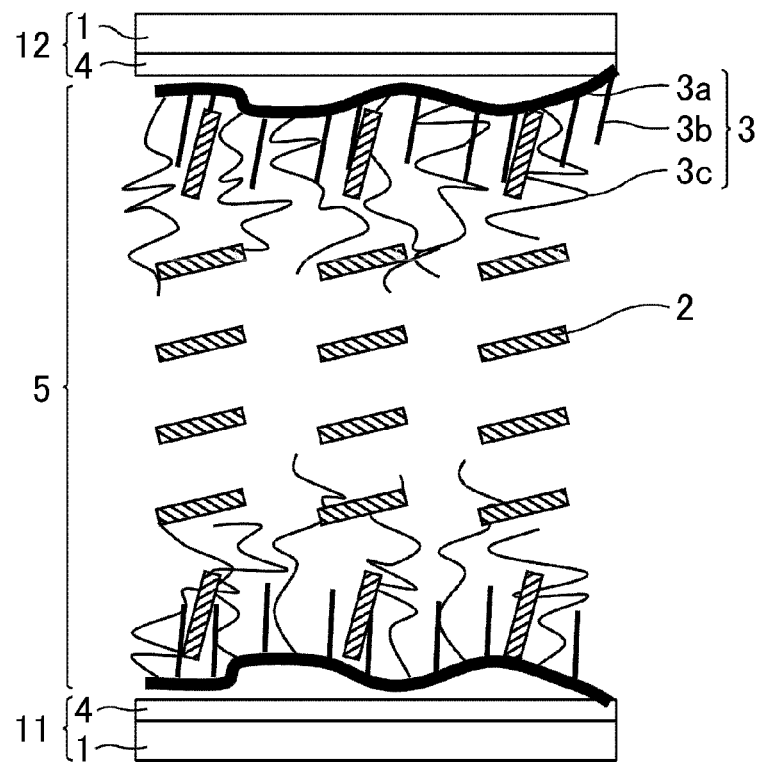
FIG. 4 is a conceptual drawing showing a principle how an alignment film according to Embodiment 1 reduces image sticking, and showing other embodiment after voltage is applied.
Figure 5:
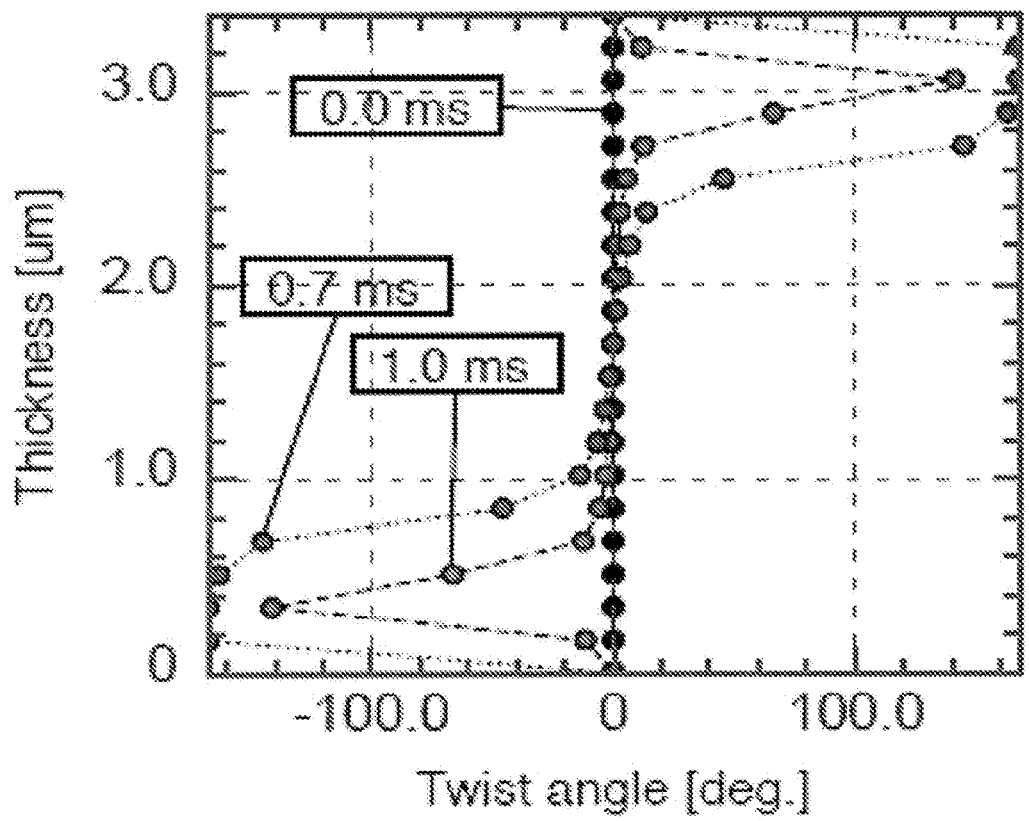
FIG. 5 is a graph showing change in the azimuthal angle of the directors in the conventional VA mode when voltage is applied.
Figure 6:
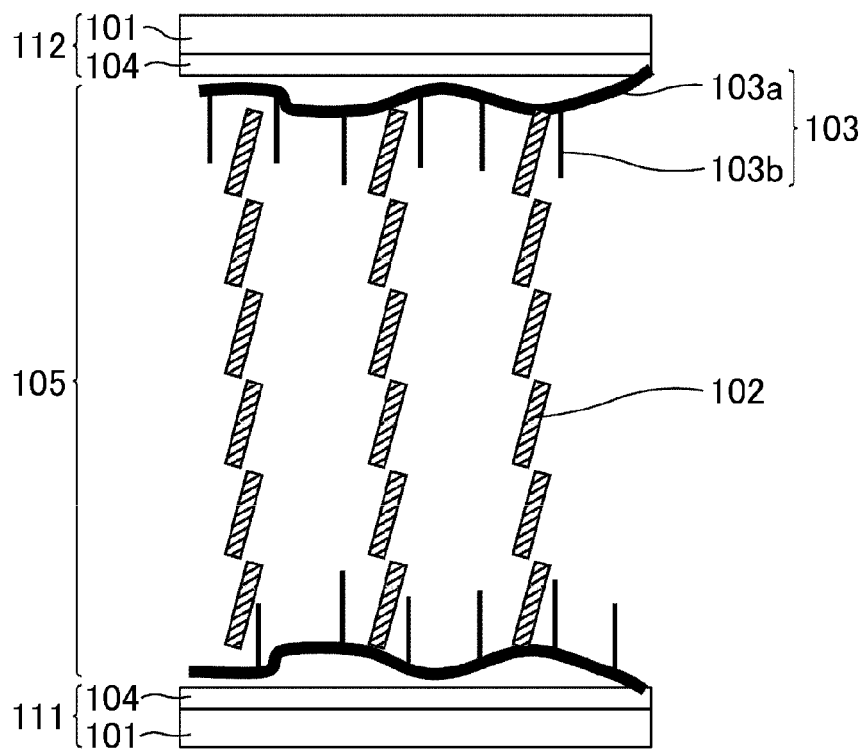
FIG. 6 is a conceptual drawing showing a principle how the "image sticking" occurs due to low polar angle anchoring strength in the case where the vertical alignment film is used, and showing an embodiment before voltage is applied.
Figure 7:
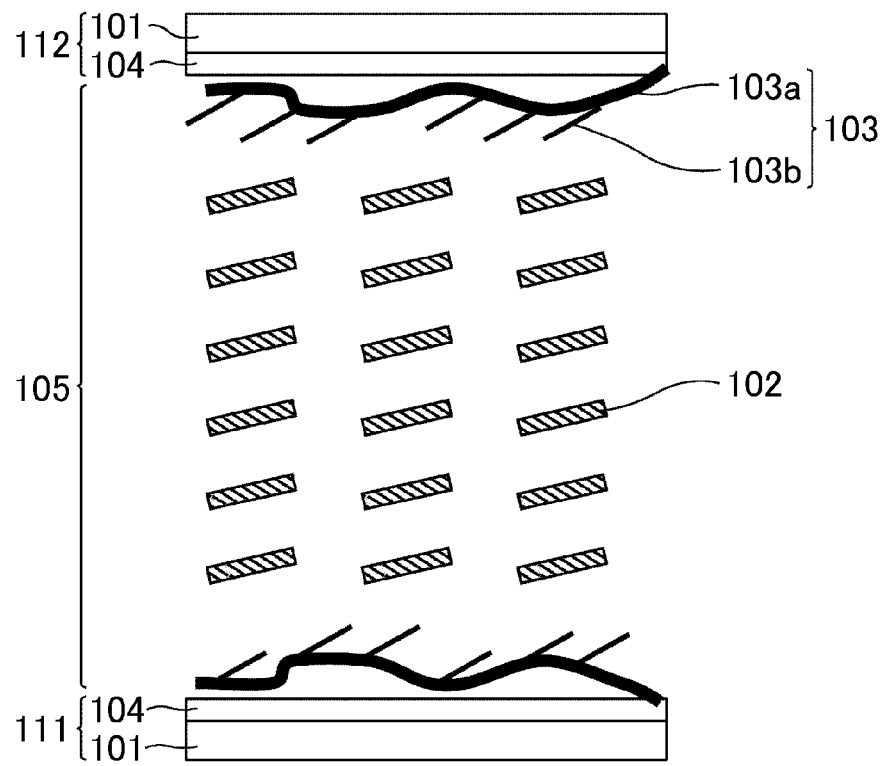
FIG. 7 is a conceptual drawing showing a principle how the "image sticking" occurs due to low polar angle anchoring strength in the case where the vertical alignment film is used, and showing a state after voltage is applied.
Figure 8:
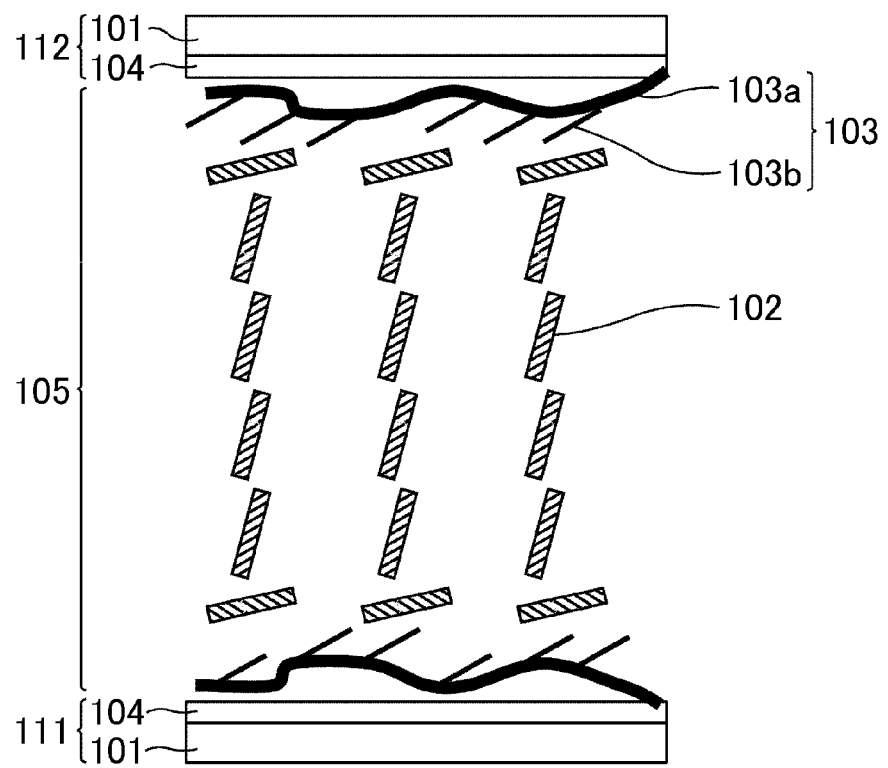
FIG. 8 is a conceptual drawing showing a principle how the "image sticking" occurs due to low polar angle anchoring strength in the case where the vertical alignment film is used, and showing a state when an electric field is switched to 0 (V/m$^2$) again.
Figure 9:
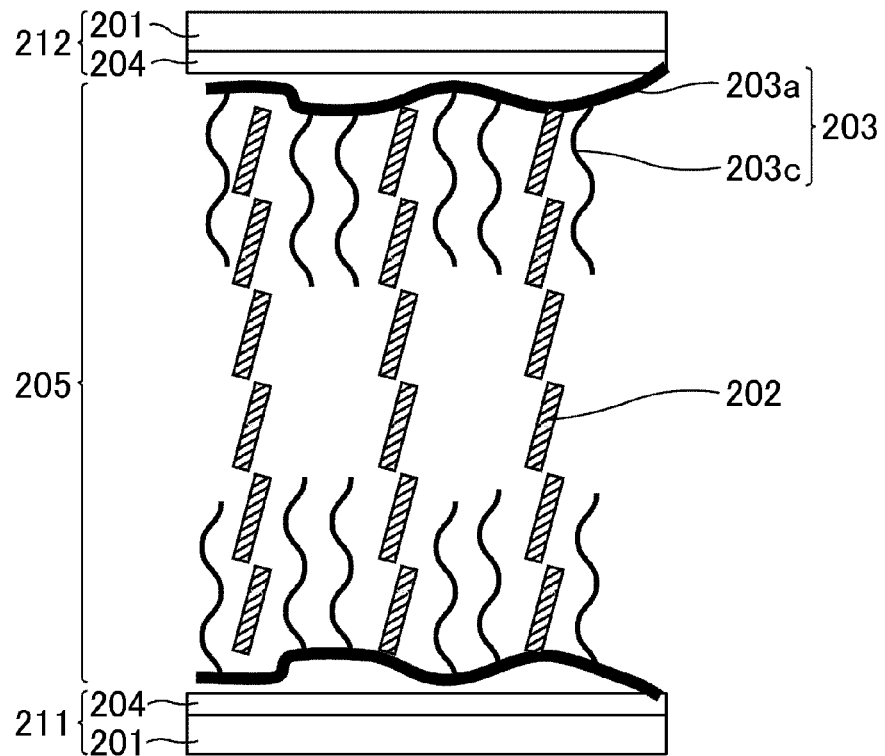
FIG. 9 is a conceptual drawing showing a principle how the image sticking is suppressed by high polar angle anchoring strength in the case where a vertical alignment film is used, and showing a state before voltage is applied.
Figure 10:
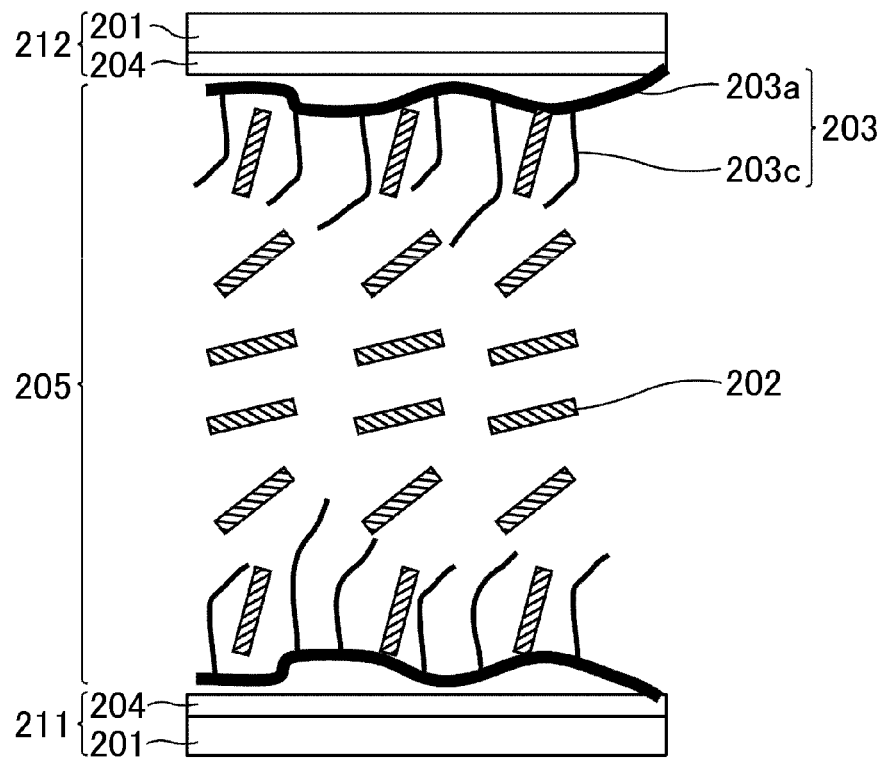
FIG. 10 is a conceptual drawing showing a principle how the image sticking is suppressed by high polar angle anchoring strength in the case where a vertical alignment film is used, and showing a state after voltage is applied.
Figure 11:
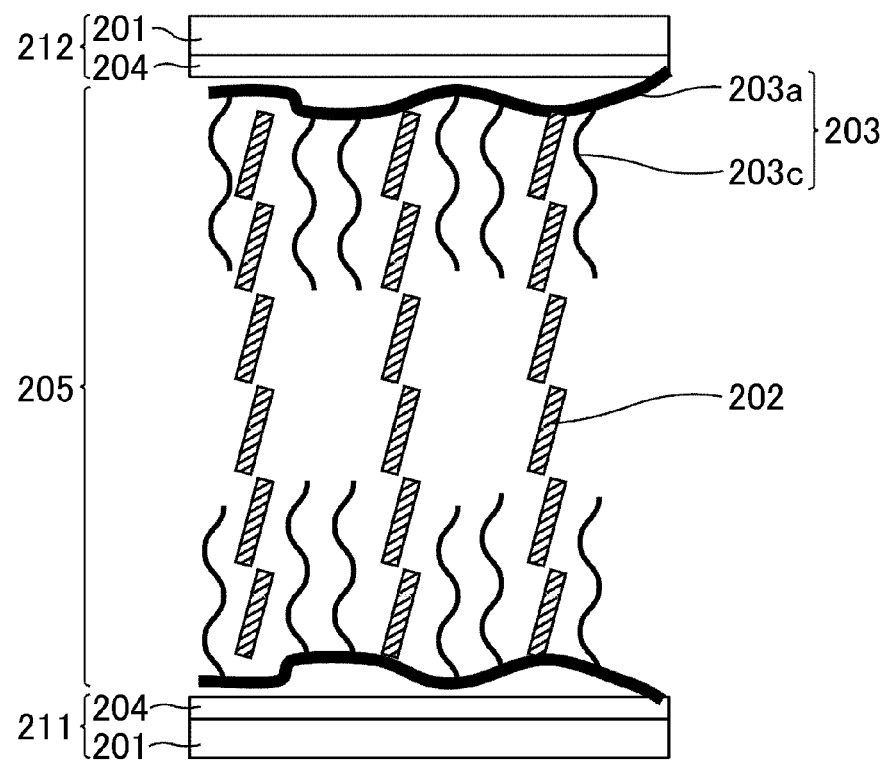
FIG. 11 is a conceptual drawing showing a principle how the image sticking is suppressed by high polar angle anchoring strength in the case where a vertical alignment film is used, and showing a state when an electric field is switched to 0 (V/m$^2$) again.

Hereinafter, using FIGS. 2 to 4, a principle how the alignment film according to Embodiment 1 reduces the image sticking will be described. FIG. 2 shows a state before voltage is applied, FIG. 3 shows one embodiment after voltage is applied, and FIG. 4 shows another embodiment after voltage is applied.

In the liquid-crystal display device according to Embodiment 1, the alignment film 3 comprises a polymer compound including the main chain 3a, the first side chain 3b, and the second side chain 3c. As shown in FIG. 2, the liquid crystal molecules 2 existing in the vicinity of the alignment film 3 in the liquid crystal layer 5 before voltage is applied are surrounded by the grafted side chain 3c longer than other side chains that form the alignment film 3, and aligned at a predetermined pretilt in a direction vertical to the surface of the support 1. For this, as shown in FIG. 3, even if a predetermined voltage is applied to the inside of the liquid crystal layer 5, the grafted side chain 3c serves as a barrier to prevent the liquid crystal molecules 2 existing in the vicinity of the alignment film 3 from being horizontally aligned. Accordingly, the grafted side chain 3c is never tilted in the horizontal direction. For this, the liquid crystal molecules 2 in the vicinity of the alignment film 3 can instantly response when the electric field is switched to other electric field such as 0 (V) after application of the voltage. As a result, occurrence of the afterimage (image sticking) can be suppressed. Moreover, as shown in FIG. 4, if a strong voltage is applied to horizontally align the liquid crystal molecules 2 existing in the vicinity of the alignment film 3, it is difficult to change the structure of the grafted side chain 3c following the movement of the liquid crystal molecules 2 because the weight average molecular weight of the grafted side chain 3c is very larger than that of the liquid crystal molecules 2. Accordingly, at any rate, the grafted side chain 3c itself can suppress tilt in the horizontal direction, and the image sticking caused by AC drive of the liquid-crystal display device is not observed.

Such a strong anchoring effect can be obtained if the weight average molecular weight of the grafted side chain is not less than 1000. From the viewpoint of giving a strong anchoring effect to almost every liquid crystal material, the weight average molecular weight is preferably not less than 3000. Meanwhile, the weight average molecular weight is preferably not more than 25000. At a weight average molecular weight more than 25000, the solubility of the polymer material itself may be reduced to prevent film formation. The grafted side chain of the polymer compound that forms the alignment film in Embodiment 1 may partially include a side chain that does not satisfy the weight average molecular weight as long as the effect of the present invention can be attained.

In the polymer compound that forms the alignment film, the weight average molecular weight of the side chain can be measured according to the following method. First, the weight average molecular weight of a target polymer material is determined by a method such as gel permeation chromatography (GPC) and static light scattering (SLS). Next, measurement by nuclear magnetic resonance (NMR) is performed, and an area ratio of a proton peak derived from the side chain to a proton peak derived from other structure is calculated. From the weight average molecular weight of the whole polymer material and the area ratio of a proton peak derived from the side chain to a proton peak derived from other structure obtained by the NMR measurement, the weight average molecular weight of the side chain portion is determined. By this method, the weight average molecular weight of the target can be measured.

Examples of a method for distinguishing the molecular weight of the first side chain from that of the second side chain in the polymer compound include the following method. First, a polyimide or a polyamic acid polymer is hydrolyzed to a monomer unit, and subjected to the GPC measurement. The first side chain includes no repeated structure, and a first side chain having a small molecular weight is not detected. Accordingly, the GPC measurement can detect only the second side chain having a large molecular weight. The first side chain can be detected using an analysis for handling a low molecular substance such as HPLC-MS (High Performance Liquid Chromatography-Mass Spectrometry: detection of mass spectrometry by high performance liquid chromatography).

The material for the alignment film in Embodiment 1 is specifically a polymer compound represented by the following formula (2):

[Chem. 3]

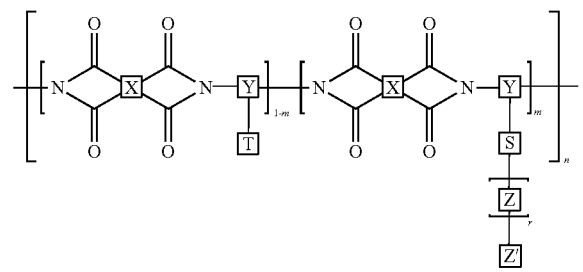

(2)

(wherein T represents a group of atoms containing one of photoreactive functional groups represented by the following formulas (3-1) to (3-6); X represents one of groups of atoms represented by the following formulas (4-1) to (4-8); Y represents one of groups of atoms represented by the following formulas (5-1) to (5-17); S represents one of groups of atoms represented by the following formulas (6-1) to (6-4); Z represents one of groups of atoms represented by the following formulas (1-1) to (1-16); Z' represents a terminal portion of the side chain, and the structure is not particularly limited; m represents a composition ratio of the monomer unit in the copolymer, and is any value of 0 to 1; and n and r represent the number of the repeated unit within the brackets, and are a positive integer.).

As shown in the formula (2), in Embodiment 1, the alignment film is formed with a polyimide copolymer including an imide structure in the main chain, and including two monomer units. In the present embodiment, the molecular weight of the first side chain is a value calculated based on T, while the weight average molecular weight of the second side chain is a value calculated based on S, the repeated structure of Z, and Z'.

Use of the imide structure in the main chain can improve thermal stability. In the case of the polymer compound material, for example, the polymer solution is applied to the substrate, and subjected to a desired heat treatment. Thereby, the alignment film can be formed. In this case, a liquid thermoplastic polyimide may be applied, and subjected to a desired heat treatment; or a polyamic acid as a precursor of polyimide may be applied to the substrate, and imidized by a heat treatment.

As shown in the formula (2), the monomer units that form the copolymer each include a different structure, and the respective monomer units influence the structure of the side chain and properties of the alignment film. In the formula (2), the monomer unit at a composition ratio of 1-m is the first monomer unit, and the monomer unit at a composition ratio of m is the second monomer unit.

The chemical structure(s) contained in the first monomer unit and/or the second monomer unit may contain other substituent as long as the chemical structure(s) is(are) essential. Among the first and second monomer units, the first monomer unit is a monomer unit that mainly functions to demonstrate the alignment orientation and pretilt angle of the liquid crystal molecules, while the second monomer unit is a monomer unit that mainly functions to enhance the polar angle anchoring strength.

In the formula (2), T represents a group of atoms containing one of photoreactive functional groups represented by the following formulas (3-1) to (3-6).

[Chem. 4]

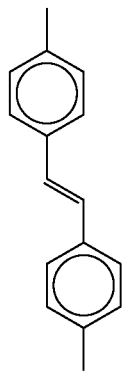
(3-1)

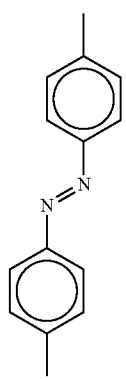
(3-2)

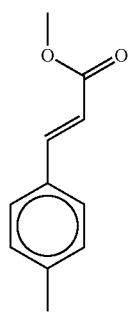
(3-3)

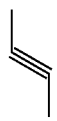
(3-4)

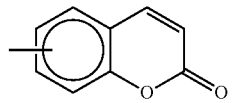
(3-5)

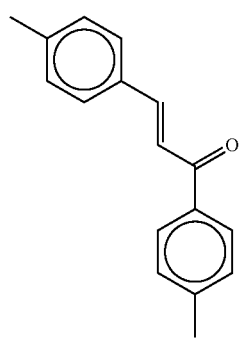
(3-6)

Among the photoreactive functional groups represented by the formulas (3-1) to (3-6), the photoreactive functional group represented by the formula (3-1) is a cinnamate group, that represented by the formula (3-2) is a chalcone group, that represented by the formula (3-3) is a diphenylethylene group, that represented by the formula (3-4) is a tolan group, that represented by the formula (3-5) is a coumarin group, and that represented by the formula (3-6) is an azobenzene group.

If the first monomer unit includes the photoreactive functional group represented by the formulas (3-1) to (3-6), the alignment film formed with the polymer compound represented by the formula (2) can be subjected to the photoalignment treatment easily. The photoalignment treatment is a treatment to irradiate a coating formed with the material for an alignment film with the light on a predetermined irradiation condition to change the properties that the coating has and give alignment properties. The properties of the alignment film given by the photoalignment treatment depend on the irradiation time of the light, the irradiation intensity of the light, the wavelength of the light used for irradiation, and the kind of the photoreactive functional group. Suitable light used for the photoalignment treatment is linearly polarized UV light, elliptically polarized UV light, circularly polarized UV light, and non-polarized UV light.

At this time, the viewing angle is significantly improved according to a configuration of a 4D-RTN (Reverse Twisted Nematic) mode, in which aligning treatment directions are made different in the pair of substrates such that the aligning treatment direction of one substrate intersects that of the other substrate, and a domain corresponding to each of pixel regions in the liquid crystal layer is divided into 4 domains (Domains) each having a different reference alignment orientation of the liquid crystal molecule. In the 4D-RTN, control of the pretilt with high accuracy is demanded. According to the liquid-crystal display device according to Embodiment 1, the polar angle anchoring strength that the alignment film has is strong, and a highly stable pretilt can be obtained. For this reason, the image sticking is hardly produced if the 4D-RTN is used.

In the formula (2), X represents one of the groups of atoms represented by the following formulas (4-1) to (4-8).

[Chem. 5]

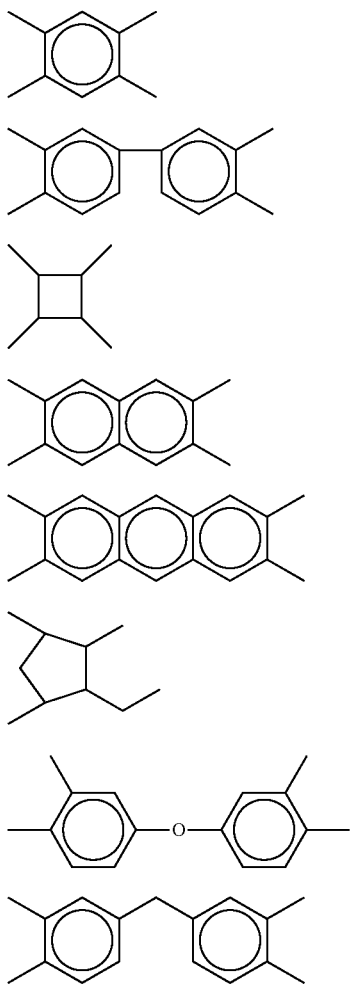

The formula (4-1) represents a most general chemical structure including a benzene ring.

As in the formula (4-2), two benzene rings are coupled to further increase thermal stability.

The formula (4-3) represents a cyclobutane ring, and is a general chemical structure provided on the side of tetracarboxylic acid in a polyimide alignment film.

As in the formula (4-4), a naphthalene structure provides more increased thermal stability than in the case of one benzene ring or coupling in (4-2).

As in the formula (4-5), an anthracene structure provides more increased thermal stability than in the case of the naphthalene structure.

The formula (4-6) represents a highly asymmetric structure. The group of atoms represented by the formula (4-6) has high solubility, and can be used in a state of polyamide and polyimide to form a film by printing or ink-jet method. In the case of low solubility, the group of atoms can be used in a state of a polyamic acid for film formation, and imidized by burning.

The formula (4-7) represents a structure in which two benzene rings are coupled via an ether bond. This structure can provide sufficient thermal stability and sufficient solubility.

The formula (4-8) represents a structure in which two benzene rings are coupled via a methylene chain. This structure can provide sufficient thermal stability and sufficient solubility.

In the formula (2), Y represents one of the groups of atoms represented by the following formulas (5-1) to (5-17):

[Chem. 6]

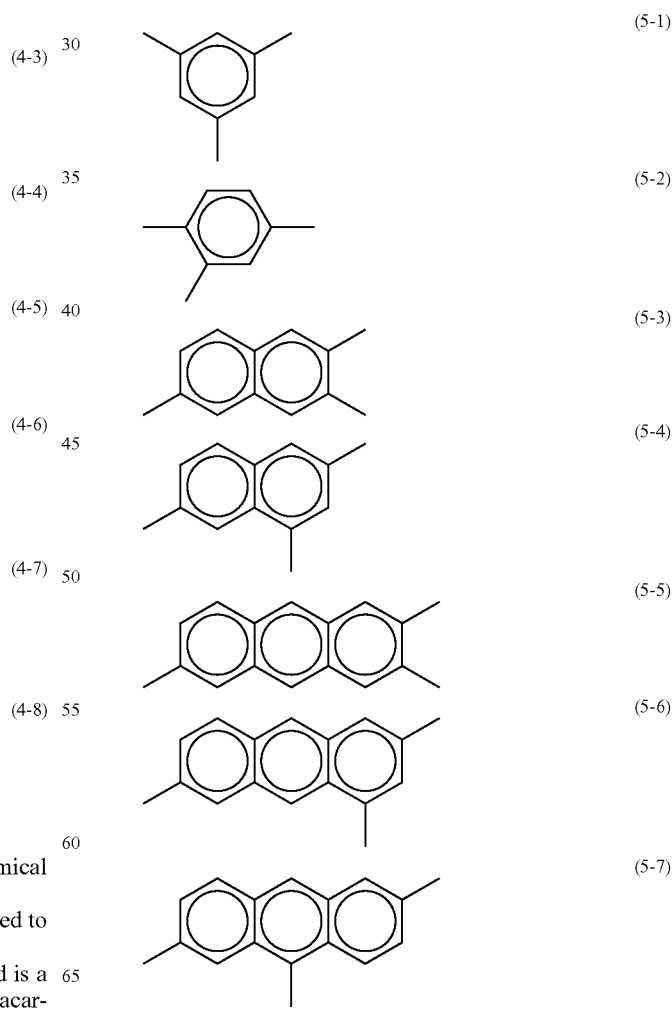

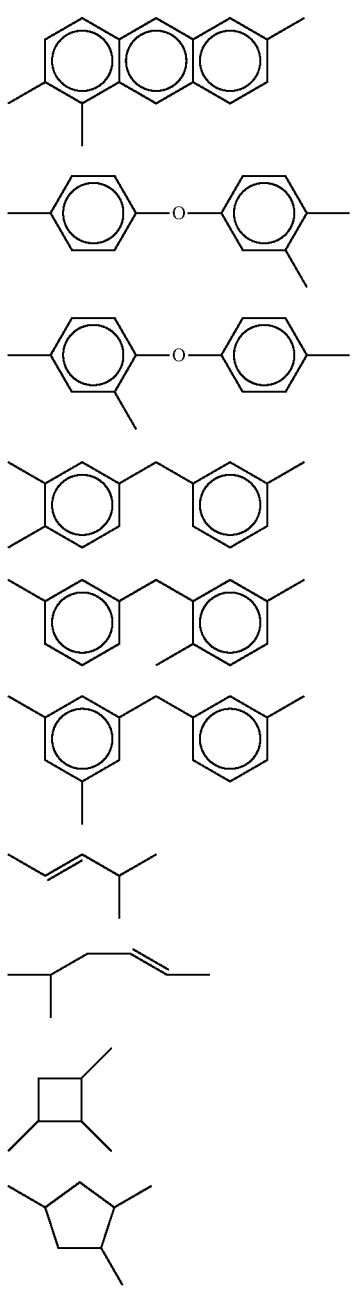

(5-8)
(5-9)
(5-10)
(5-11)
(5-12)
(5-13)
(5-14)
(5-15)
(5-16)
(5-17)

The formula (5-1) represents a most general chemical structure including a benzene ring.

The formula (5-2) represents a general structure similarly to (5-1), but the alignment properties may be improved by bonding a bonding group to 1, 3, and 4 sites. (5-1) or (5-2) may be selected depending on the result of evaluation.

The formula (5-3) provides thermal stability higher than those of (5-1) and (5-2).

The formula (5-4) provides substantially the same thermal stability as that in (5-3), but gives an influence to the alignment properties. Accordingly, the result of (5-3) and that of (5-4) may be compared and the better one may be selected.

The formula (5-5) provides thermal stability much higher than those of (5-3) and (5-4).

The formulas (5-6) to (5-8) provide substantially the same thermal stability as that in (5-5), but give an influence to the alignment properties. Accordingly, the results of evaluation of (5-5) to (5-8) may be checked, and the better structure may be selected.

The formulas (5-9) and (5-10) include two benzene rings, and provide thermal stability. The ether bond in the structure provides flexibility higher than those in (5-3) and (5-4), leading to higher solubility.

The formulas (5-11) to (5-13) represent a structure in which two benzene rings are coupled via a methylene chain to enhance the thermal stability while the solubility is secured. This structure provides a higher flexibility and a higher solubility.

The formulas (5-14) and (5-15) represent a structure in which the solubility of polyimide is further enhanced by not making the structure cyclic. A conjugated structure can be introduced to form an aryl type structure, thereby maintaining the thermal stability.

As in the formula (5-16), a cyclic aliphatic compound can provide the solubility higher than that of the cyclic conjugated compound, and can maintain the thermal stability.

As in the formula (5-17), use of an asymmetric cyclic aliphatic compound can provide sufficient solubility and maintain the thermal stability.

In the formula (2), S represents a group of atoms disposed between the main chain and the repeated structure of the side chain, and one of the groups of atoms represented by the following formulas (6-1) to (6-4):

[Chem. 7]

(6-1)

(6-2)

—O—
(6-3)

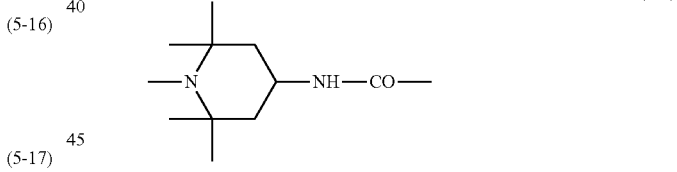
(6-4)

The formula (6-1) represents an ester bond, which is a general chemical structure by which the main chain and the side chain are coupled easily.

The formula (6-2) represents an amide bond, which is a chemical structure by which the main chain and the side chain can be coupled easily, as well as the ester bond. The amide bond has hydrogen bonding properties higher than those of the ester bond. Depending on an interaction between side chains or an interaction between the side chain and the liquid crystal molecules, the amide bond may have advantages in device properties such as display properties of the liquid crystal display and reliability.

The formula (6-3) represents an ether bond, which has the stability to acid and alkali higher than those of the ester bond and the amide bond.

The group of atoms represented by the formula (6-4) can be easily synthesized from a chain transfer agent used with an initiator (4-amino-2,2,6,6-tetramethylpiperidinyl-1-oxy radical) when a living radical polymerization is performed, for example.

In the formula (2), Z represents at least one repeated unit represented by the following formulas (1-1) to (1-16):

[Chem. 8]

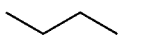 (1-1)

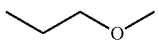 (1-2)

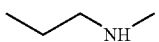 (1-3)

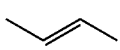 (1-4)

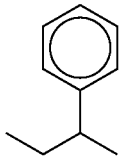 (1-5)

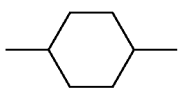 (1-6)

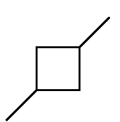 (1-7)

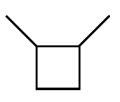 (1-8)

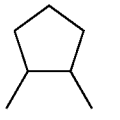 (1-9)

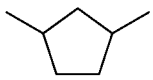 (1-10)

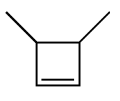 (1-11)

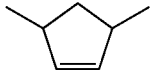 (1-12)

 (1-13)

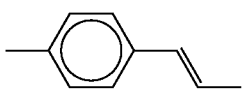 (1-14)

-continued

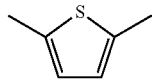 (1-15)

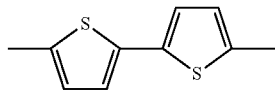 (1-16)

The formula (1-1) represents an alkyl chain, which is a most general side chain. The alkyl chain has high flexibility, and use thereof in combination with other rigid side chain is effective.

The formula (1-2) represents an ethylene glycol chain. The ethylene glycol chain has hydrogen bonding properties, and is particularly effective in the case of forming a hydrogen bond with the liquid crystal molecule.

The formula (1-3) represents a side chain having higher hydrogen bonding properties. As described above, this side chain is effective in the case of forming a hydrogen bond with the liquid crystal molecule.

The formula (1-4) represents a highly developed conjugated system that leads to high rigidity. For this, the liquid crystal molecules contacting the side chain are hardly influenced in the presence of an external electric field, and the alignment state thereof is hardly changed.

The formula (1-5) represents polystyrene, which includes a phenyl group, is bulky and highly rigid. Accordingly, polystyrene can increase an alignment regulating force to the liquid crystal molecules in the vicinity of the interface.

The formula (1-6) represents a cyclohexane ring, which is cyclic and highly rigid as above.

The formula (1-7) represents a 1,3-cyclobutane ring, which is cyclic and highly rigid as above.

The formula (1-8) represents a 1,2-cyclobutane ring, which is cyclic and highly rigid as above.

The formula (1-9) represents a 1,2-cyclopentane ring, which is more asymmetric than cyclohexane and cyclobutane, and has higher solubility in a solvent. Higher solubility can increase the molecular weight of an oligomer that forms the side chain.

The formula (1-10) represents a 1,3-cyclopentane ring, which provides the same effect as that in (1-9).

The formula (1-11) includes a double bond, which provides rigidity higher than that of the cyclic structure. Higher rigidity has advantages in stronger anchoring (stronger alignment regulation) because fluctuation of the liquid crystal molecules and an influence of external field response are reduced, for example.

The formula (1-12) also includes a double bond, which provides rigidity higher than that of the cyclic structure. As rigidity is increased, solubility is reduced, leading to difficulties in polymerization (oligomerization) of the side chain. As in (1-12), however, an asymmetric structure provides solubility higher than that in (1-11), and has an advantage of easy synthesis. Moreover, because the object of the present invention can be attained by oligomerizing the side chain, the structure of (1-12) is more effective than that of (1-11).

The formula (1-13) represents a biphenyl ring, which has symmetry higher than that in (1-12), and difficulties in handling. The biphenyl ring is more general than the group of atoms in (1-12), and a synthesis starting material is available at low cost.

The formula (1-14) represents polyphenylene vinylene, which is often used as one of polymer materials having high rigidity. Polyphenylene vinylene is a highly general-purpose material, and relatively easily available because the synthesis route thereof is established. Because of its rigidity, polyphenylene vinylene is suitably used for the present invention.

The formula (1-15) represents polythiophene, which has high rigidity and is a highly general-purpose material as well as polyphenylene vinylene.

The formula (1-16) represents a regioregular polythiophene. Because of its regioregularity, polymerization is easier, and a degree of polymerization is easy to increase. Thereby, the scope of selection of the molecular weight and the degree of polymerization is wider than that in (1-15).

If the second monomer unit includes one of the repeated units (hereinafter, also referred to as a grafted side chain unit in some cases.) represented by the formulas (1-1) to (1-16), the polymer compound represented by the formula (2) has a high weight average molecular weight of the side chain. The second monomer unit in the formula (2) contains a repeated unit having the repetition number of r.

Because the weight average molecular weight of the side chain per second monomer unit is not less than 1000, the alignment film has high polar angle anchoring strength. Thereby, high stability of the alignment of the liquid crystal molecules can be provided to significantly reduce the possibility of occurrence of the image sticking. For example, in the case of the repeated unit represented by the formula (1-5), if the number of r is at least 10, a side chain can be obtained in which the weight average molecular weight of the side chain oligomer is not less than 1000.

In the formula (2), Z' is a structure that represents the terminal portion of the side chain. The structure is not particularly limited. For example, by chemically introducing fluorocarbon $\{(-CF_2)_n-CF_3\}$ into this portion, the liquid crystal alignment properties can be changed.

As in Embodiment 1, if the first monomer unit includes the photoreactive functional group represented by the formulas (3-1) to (3-6), the polymer compound represented by the formula (2) can be easily subjected to the photoalignment treatment. Moreover, if the second monomer unit includes the repeated unit represented by the formulas (1-1) to (1-16), a large weight average molecular weight of the side chain can be easily given to the polymer compound represented by the formula (2) to reduce the image sticking. Further, if one polymer compound includes two monomer units as above, the amount of the light used in the photoalignment treatment can be reduced to improve the throughput.

Embodiment 2

Embodiment 2 is an example of the liquid-crystal display device according to the present invention, and the liquid-crystal display device produced by the production process according to the present invention using the composition for forming an alignment film according to the present invention.

FIG. 1 is a conceptual drawing also showing characteristics of the liquid-crystal display device according to Embodiment 2. The alignment film included in the liquid-crystal display device according to Embodiment 2 is the same as that in Embodiment 1 except that the alignment film is formed with the polymer compound represented by the following formula (7).

A material for an alignment film in Embodiment 2 is specifically a polymer compound represented by the following formula (7):

[Chem. 9]

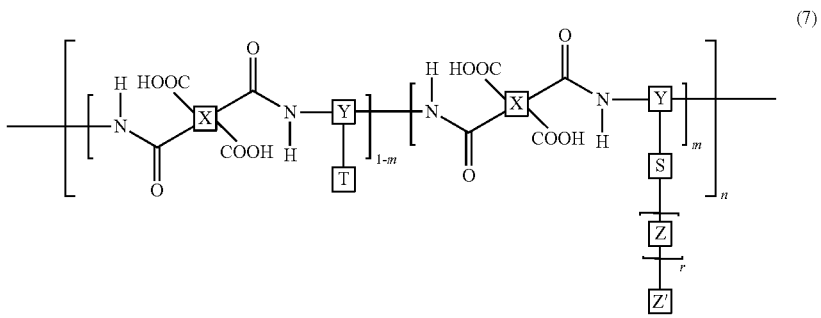

(wherein T represents a group of atoms containing one of photoreactive functional groups represented by the formulas (3-1) to (3-6); X represents one of groups of atoms represented by the formula (4-1) to (4-8); Y represents one of groups of atoms represented by the formulas (5-1) to (5-17); S represents one of groups of atoms represented by the formulas (6-1) to (6-4); Z represents one of groups of atoms represented by the formulas (1-1) to (1-16); Z' represents a terminal portion of the side chain, and the structure is not particularly limited; m represents a composition ratio of the monomer unit in the copolymer, and is any value of 0 to 1; and n and r represent the number of the repeated unit within the brackets, and are a positive integer.).

As shown in the formula (7), in Embodiment 2, the alignment film comprises a polyamic acid copolymer including an amic acid structure in the main chain and including two monomer units. In the present embodiment, the molecular weight of the first side chain is a value calculated based on T, while the weight average molecular weight of the second side chain is a value calculated based on S, the repeated structure of Z, and Z'.

A polymer solution represented by the formula (7) including an amic acid structure is applied onto the substrate, and subjected to a heat treatment at a high temperature (not less than 120° C.) to be partially imidized. Thereby, the alignment film can be formed.

As shown in the formula (7), the monomer units that form the copolymer each include a different structure, and the respective monomer units influence the structure of the side chain and the properties of the alignment film. In the formula (7), the monomer unit at a composition ratio of 1-m is the first monomer unit, and the monomer unit at a composition ratio of m is the second monomer unit.

The chemical structure(s) contained in the first monomer unit and/or the second monomer unit may contain other substituent as long as the chemical structure(s) is(are) essential. Among the first and second monomer units, the first monomer unit is a monomer unit that mainly functions to demonstrate the alignment orientation and pretilt angle of the liquid crystal molecule, while the second monomer unit is a monomer unit that mainly functions to enhance the polar angle anchoring strength.

Similarly to Embodiment 1, as in Embodiment 2, if the first monomer unit includes the photoreactive functional group represented by the formulas (3-1) to (3-6), the polymer compound represented by the formula (7) can be easily subjected to the photoalignment treatment. Moreover, if the second monomer unit includes the repeated unit represented by the formulas (1-1) to (1-16), a large weight average molecular weight can be easily given to the side chain in the polymer compound represented by the formula (7) to reduce the image sticking. Further, if one polymer compound includes two monomer units as above, the amount of the light used in the photoalignment treatment can be reduced to improve the throughput.

Embodiment 3

Embodiment 3 is an example of the liquid-crystal display device according to the present invention, and the liquid-crystal display device produced by the production process according to the present invention using the composition for forming an alignment film according to the present invention. FIG. 1 is a conceptual drawing also showing characteristics of the liquid-crystal display device according to Embodiment 3. The alignment film included in the liquid-crystal display device according to Embodiment 3 is the same as that in Embodiment 1 except that the alignment film is formed with the polymer compound represented by the following formula (8).

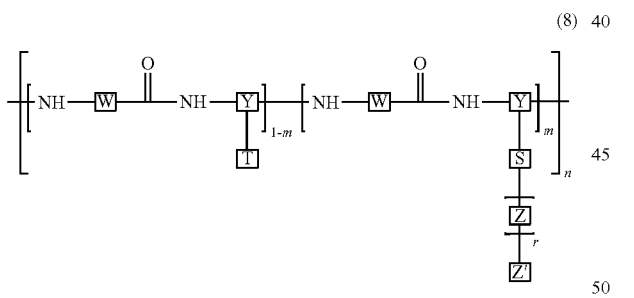
(8)

A material for an alignment film in Embodiment 3 is specifically a polymer compound represented by the following formula (8):
(wherein T represents a group of atoms containing one of photoreactive functional groups represented by the formulas (3-1) to (3-6); W represents one of groups of atoms represented by the following formulas (9-1) to (9-17); Y represents one of groups of atoms represented by the formulas (5-1) to (5-17); S represents one of groups of atoms represented by the formulas (6-1) to (6-4); Z represents one of groups of atoms represented by the formulas (1-1) to (1-16); Z' represents a terminal portion of the side chain, and the structure is not particularly limited; m represents a composition ratio of the monomer unit in the copolymer, and is any value of 0 to 1; and n and r represent the number of the repeated unit within the brackets, and are a positive integer.).

As shown in the formula (8), in Embodiment 3, the alignment film comprises a polyamide copolymer including an amide structure in the main chain and including two monomer units. In the present embodiment, the molecular weight of the first side chain is a value calculated based on T, while the weight average molecular weight of the second side chain is a value calculated based on S, the repeated structure of Z, and Z'.

Polyamide has thermal stability lower than that of polyimide and higher than that of polyvinyl. Moreover, polyamide has solubility higher than that of polyimide, and is easy to form a film by printing, ink-jet method, or the like. Polyamide can be easily synthesized by a condensation polymerization.

In the case of the material for an alignment film including polyamide in the formula (8), for example, a polymer solution can be applied to the substrate, and subjected to a desired heat treatment to form the alignment film.

As shown in the formula (8), the monomer units that form the copolymer each include a different structure, and the respective monomer units influence the structure of the side chain and the properties of the alignment film. In the formula (8), the monomer unit at a composition ratio of 1-m is the first monomer unit, and the monomer unit at a composition ratio of m is the second monomer unit.

The chemical structure(s) contained in the first monomer unit and/or the second monomer unit may contain other substituent as long as the chemical structure(s) is(are) essential. Among the first and second monomer units, the first monomer unit is a monomer unit that mainly functions to demonstrate the alignment orientation and pretilt angle of the liquid crystal molecule, while the second monomer unit is a monomer unit that mainly functions to enhance the polar angle anchoring strength.

In the formula (8), W represents one of groups of atoms represented by the following formulas (9-1) to (9-17).

[Chem. 11]

(9-1)

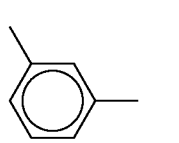
(9-2)

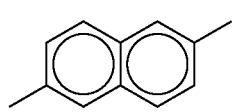
(9-3)

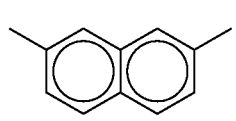
(9-4)

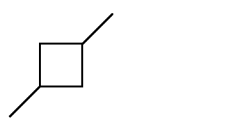
(9-5)

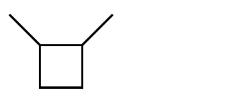
(9-6)

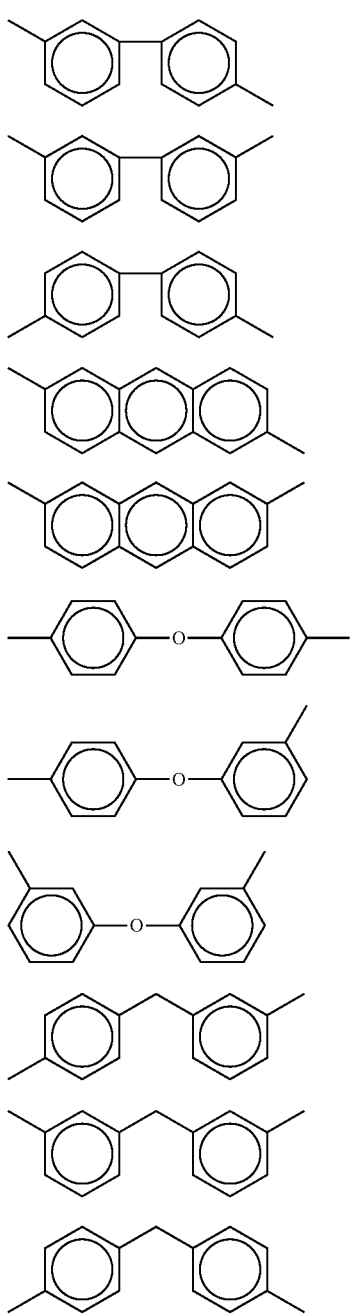

(9-7)
(9-8)
(9-9)
(9-10)
(9-11)
(9-12)
(9-13)
(9-14)
(9-15)
(9-16)
(9-17)

The chemical structures represented by the formulas (9-1) to (9-17) are a structure in which the main chain is polyamide, and therefore, the number of bonds in the formulas (5-1) to (5-17) is adjusted. Accordingly, the effect and properties of the formulas (9-1) to (9-17) are the same as those described in the formulas (5-1) to (5-17).

Similarly to Embodiment 1, as in Embodiment 3, if the first monomer unit includes the photoreactive functional group represented by the formulas (3-1) to (3-6), the polymer compound represented by the formula (8) can be easily subjected to the photoalignment treatment. Moreover, if the second monomer unit includes the repeated unit represented by the formulas (1-1) to (1-16), a large weight average molecular weight can be easily given to the side chain in the polymer compound represented by the formula (8) to reduce the image sticking. Further, if one polymer compound includes two monomer units as above, the amount of the light used in the photoalignment treatment can be reduced to improve the throughput.

Embodiment 4

Embodiment 4 is an example of the liquid-crystal display device according to the present invention, and the liquid-crystal display device produced by the production process according to the present invention using the composition for forming an alignment film according to the present invention. FIG. 1 is a conceptual drawing also showing characteristics of the liquid-crystal display device according to Embodiment 4. The alignment film included in the liquid-crystal display device according to Embodiment 4 is the same as that in Embodiment 1 except that the alignment film is formed with the polymer compound represented by the following formula (10).

A material for an alignment film in Embodiment 4 is specifically a polymer compound represented by the following formula (10):

[Chem. 12]

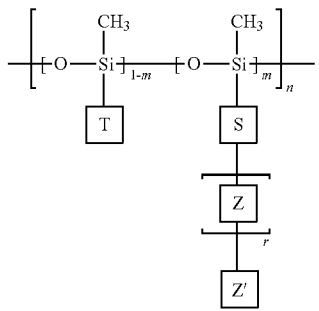

(10)

(wherein T represents a group of atoms containing one of photoreactive functional groups represented by the formulas (3-1) to (3-6); S represents one of groups of atoms represented by the formulas (6-1) to (6-4); Z represents one of groups of atoms represented by the formulas (1-1) to (1-16); Z' represents a terminal portion of the side chain, and the structure is not particularly limited; m represents a composition ratio of the monomer unit in the copolymer, and is any value of 0 to 1; and n and r represent the number of the repeated unit within the brackets, and are a positive integer.).

As shown in the formula (10), in Embodiment 4, the alignment film comprises a polysiloxane copolymer including a siloxane structure in the main chain and including two monomer units. In the present embodiment, the molecular weight of the first side chain is a value calculated based on T, while the weight average molecular weight of the second side chain is a value calculated based on S, the repeated structure of Z, and Z'.

Polysiloxane has substantially the same thermal stability as that of polyamide, and has thermal stability higher than that of polyvinyl. Polysiloxane has solubility higher than that of polyimide, and is easy to form a film by printing, ink-jet method, or the like.

In the case of the material for an alignment film including the siloxane structure in the formula (10), for example, a polymer solution can be applied to the substrate, and subjected to a desired heat treatment to form the alignment film.

As shown in the formula (10), the monomer units that form the copolymer each include a different structure, and the respective monomer units influence the structure of the side chain and properties of the alignment film. In the formula (10), the monomer unit at a composition ratio of 1-m is the first monomer unit, and the monomer unit at a composition ratio of m is the second monomer unit.

The chemical structure(s) contained in the first monomer unit and/or the second monomer unit may contain other substituent as long as the chemical structure(s) is(are) essential. Among the first and second monomer units, the first monomer unit is a monomer unit that mainly functions to demonstrate the alignment orientation and pretilt angle of the liquid crystal molecule, while the second monomer unit is a monomer unit that mainly functions to enhance the polar angle anchoring strength.

Similarly to Embodiment 1, in Embodiment 4, if the first monomer unit includes the photoreactive functional group represented by the formulas (3-1) to (3-6), the polymer compound represented by the formula (10) can be easily subjected to the photoalignment treatment. Moreover, if the second monomer unit includes the repeated unit represented by the formulas (1-1) to (1-16), a large weight average molecular weight can be easily given to the side chain in the polymer compound represented by the formula (10) to reduce the image sticking. Further, if one polymer compound includes two monomer units as above, the amount of the light used in the photoalignment treatment can be reduced to improve the throughput.

Embodiment 5

Embodiment 5 is an example of the liquid-crystal display device according to the present invention, and the liquid-crystal display device produced by the production process according to the present invention using the composition for forming an alignment film according to the present invention. FIG. 1 is a conceptual drawing also showing characteristics of the liquid-crystal display device according to Embodiment 5. The alignment film included in the liquid-crystal display device according to Embodiment 5 is the same as that in Embodiment 1 except that the alignment film is formed with the polymer compound represented by the following formula (11-1) or (11-2).

[Chem. 13]

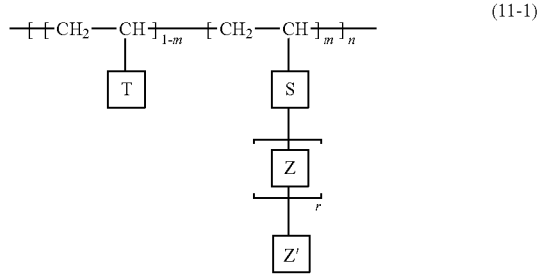

(11-1)

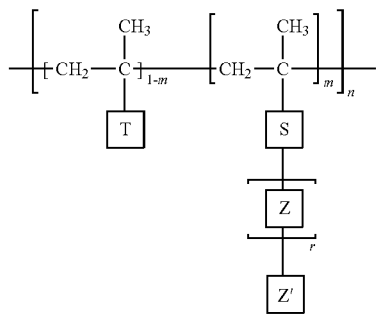

(wherein T represents a group of atoms containing one of photoreactive functional groups represented by the formulas (3-1) to (3-6); S represents one of groups of atoms represented by the formulas (6-1) to (6-4); Z represents one of groups of atoms represented by the formulas (1-1) to (1-16); Z' represents a terminal portion of the side chain, and the structure is not particularly limited; m represents a composition ratio of the monomer unit in the copolymer, and is any value of 0 to 1; and n and r represent the number of the repeated unit within the brackets, and are a positive integer.).

As shown in the formulas (11-1) and (11-2), in Embodiment 5, the alignment film comprises a polyvinyl copolymer including a vinyl structure in the main chain and including two monomer units.

In the formulas (11-1) and (11-2), the main chain is a vinyl group, which is an acrylic group in (11-1) and a methacylic group in (11-2). Such a structure has advantages in formation of the alignment film at low cost because polyvinyl has thermal stability lower than those of polyimide, polyamide, and polysiloxane, but has the highest solubility of these, synthesis is easy, and the cost of the reagent is also low. Additionally, polyvinyl is highly useful because polyvinyl is very easy to synthesize from a starting substance such as acryloyl chloride and methacryloyl chloride.

In the case of the material for an alignment film including a vinyl structure in the formula (11-1) or (11-2), for example, a polymer solution can be applied to the substrate, and subjected to a desired heat treatment to form the alignment film.

As shown in the formulas (11-1) and (11-2), the monomer units that form the copolymer each include a different structure, and the respective monomer units influence the structure of the side chain and the properties of the alignment film. In the formulas (11-1) and (11-2), the monomer unit at a composition ratio of 1-m is the first monomer unit, and the monomer unit at a composition ratio of m is the second monomer unit.

The chemical structure (s) contained in the first monomer unit and/or the second monomer unit may contain other substituent as long as the chemical structure(s) is(are) essential. Among the first and second monomer units, the first monomer unit is a monomer unit that mainly functions to demonstrate the alignment orientation and pretilt angle of the liquid crystal molecule, while the second monomer unit is a monomer unit that mainly functions to enhance the polar angle anchoring strength.

Similarly to Embodiment 1, as in Embodiment 5, if the first monomer unit includes the photoreactive functional group represented by the formulas (3-1) to (3-6), the polymer compound represented by the formula (11-1) or (11-2) can be easily subjected to the photoalignment treatment. Moreover, if the second monomer unit includes the repeated unit represented by the formulas (1-1) to (1-16), a large weight average molecular weight can be easily given to the side chain in the polymer compound represented by the formula (11-1) or (11-2) to reduce the image sticking. Further, if one polymer compound includes two monomer units as above, the amount of the light used in the photoalignment treatment can be reduced to improve the throughput.

EXAMPLES

Example 1

Example 1 will be shown below in which a liquid-crystal display device was produced according to the liquid-crystal display device according to Embodiment 1. An alignment film was formed on each of the substrates in the pair comprising an electrode, the alignment film comprising a copolymer produced using a first monomer including a cinnamate group represented by the formula (3-1) as the photoreactive functional group and a second monomer including the group of atoms represented by the formula (1-5) as the repeated unit and the group of atoms represented by the formula (6-4) between the main chain and the repeated structure. The polymer compound formed in Example 1, which forms the alignment film is polyimide represented by the following formula (12):

[Chem. 14]

(12)

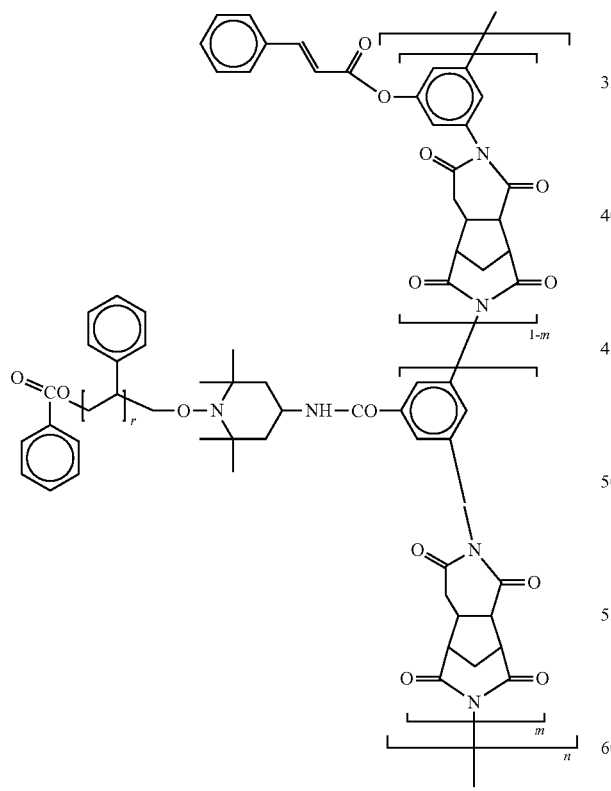

(wherein m represents a composition ratio of the monomer unit in the copolymer, and is any value of 0 to 1; and n and r represent the number of the repeated unit within the brackets, and are a positive integer.).

The alignment film was formed using spin coating while the concentration and the number of rotation were adjusted such that the film thickness was 50 to 60 nm. Other film forming method such as a printing method and an ink-jet method can also be used.

After film formation, prebaking was performed, followed by postbaking. Next, the alignment film was subjected to an aligning treatment by irradiating the surface of the alignment film with polarized UV light from an oblique direction such that the alignment film had properties such that the pretilt angle to be given to the liquid crystal molecules was not less than 86° and less than 90°. Subsequently, a sealing material was applied to one of the substrates, and beads were spread on the other substrate. Then, the one substrate was applied to the other such that the one alignment orientation of the liquid crystal molecules in the vicinity of the alignment film perpendicularly intersected the other alignment orientation thereof. A liquid crystal material showing negative dielectric anisotropy was injected between the pair of substrates to produce a liquid crystal panel. As the liquid crystal material, MLC-6608 (made by Merck KGaA) was used.

The grafted side chain of the polymer compound represented by the formula (12) was synthesized by a living radical polymerization in order to reduce weight average molecular weight distribution. Specifically, according to the following chemical equations (13) to (15), a portion of a second monomer unit in the polymer compound represented by the formula (12) was synthesized.

First, as a first step, as shown in the chemical equation (13):

[Chem. 15]

(13)

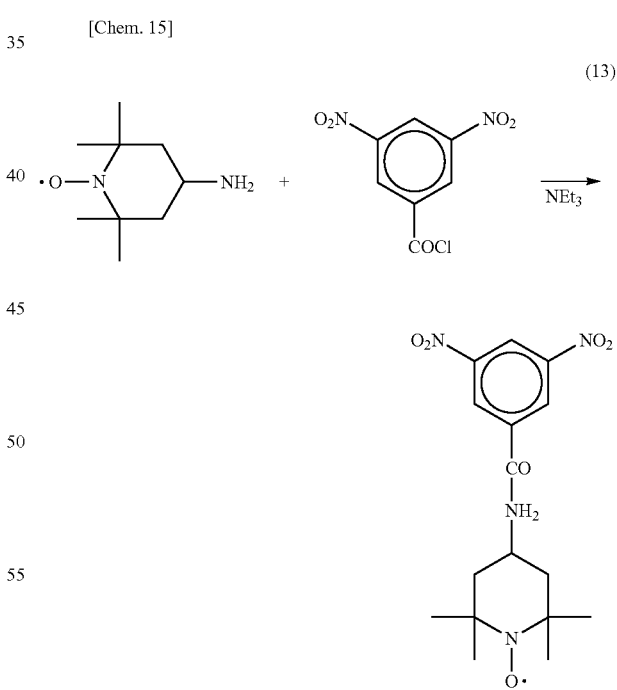

a predetermined amount of 4-amino-2,2,6,6-tetramethylpiperidinyl-1-oxy radical, a predetermined amount of 1,3-dinitrobenzoyl chloride, and a predetermined amount of triethylamine were mixed at room temperature in dry benzene, and stirred. Subsequently, as a second step, as shown in the chemical equation (14):

[Chem. 16]

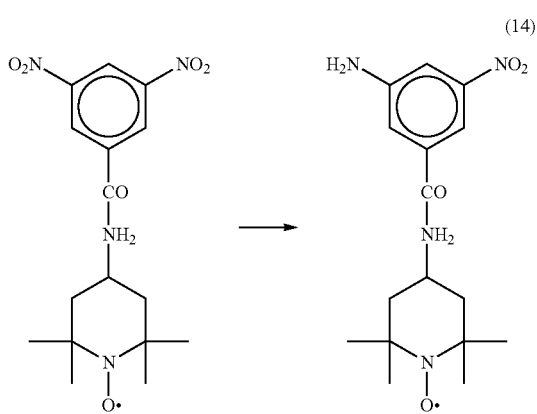

(14)

the compound obtained in the first step was reduced. Subsequently, as a third step, as shown in the chemical equation (15):

[Chem. 17]

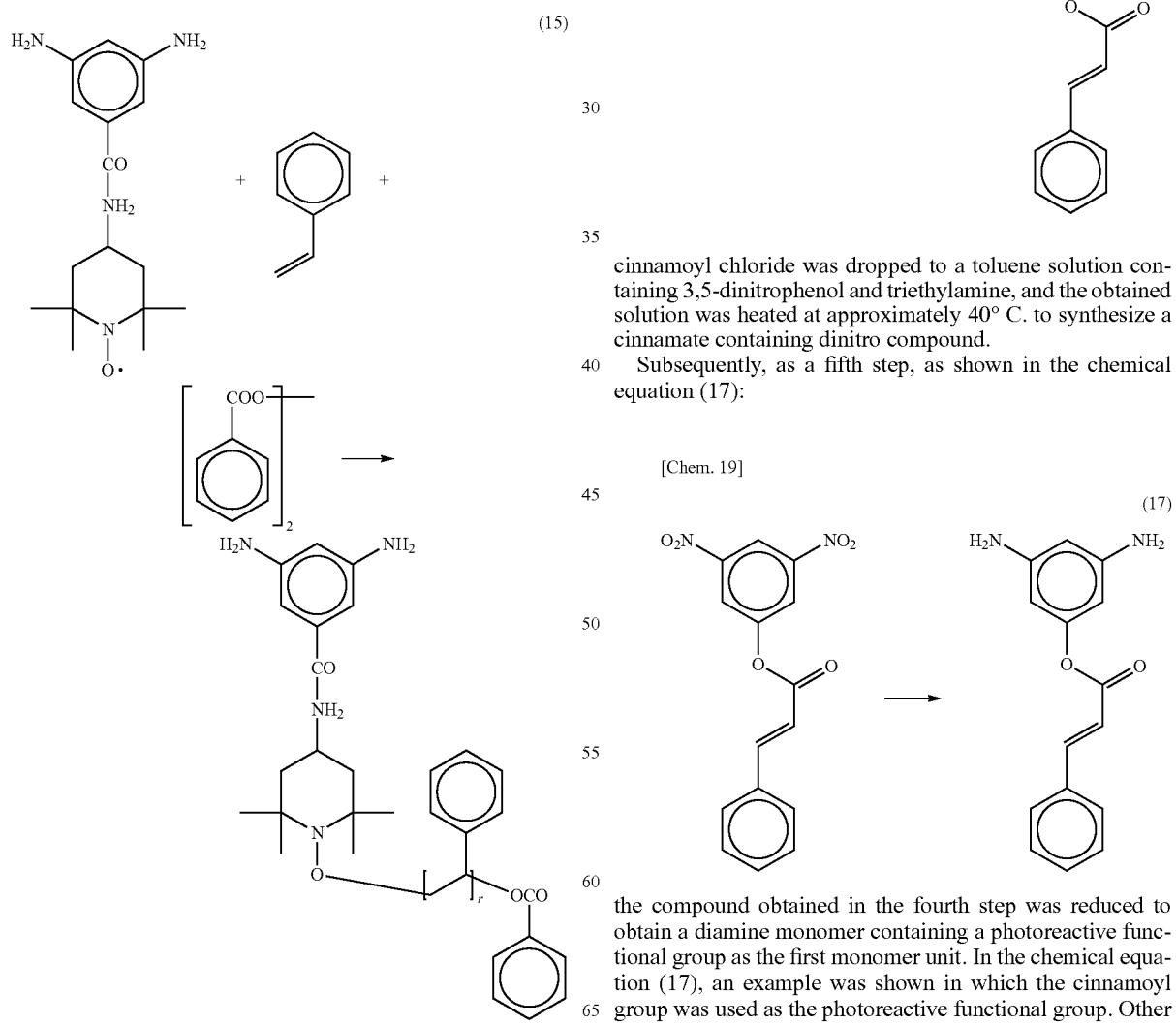

(15)

(wherein r represents the number of the repeated structure within the brackets, and is a positive integer.) styrene and benzoic anhydride were added to the compound obtained in the second step, mixed, and stirred. Thereby, a diamine monomer including a repeated structure as the second monomer unit was obtained.

Next, as a fourth step, as shown in the chemical equation (16):

[Chem. 18]

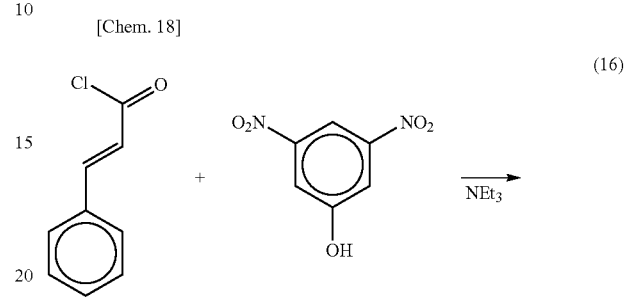

(16)

cinnamoyl chloride was dropped to a toluene solution containing 3,5-dinitrophenol and triethylamine, and the obtained solution was heated at approximately 40° C. to synthesize a cinnamate containing dinitro compound.

Subsequently, as a fifth step, as shown in the chemical equation (17):

[Chem. 19]

(17)

the compound obtained in the fourth step was reduced to obtain a diamine monomer containing a photoreactive functional group as the first monomer unit. In the chemical equation (17), an example was shown in which the cinnamoyl group was used as the photoreactive functional group. Other photoreactive functional group represented by the formulas (3-1) to (3-6) may be used.

Subsequently, as a sixth step, as shown in the chemical equation (18):

[Chem. 20]

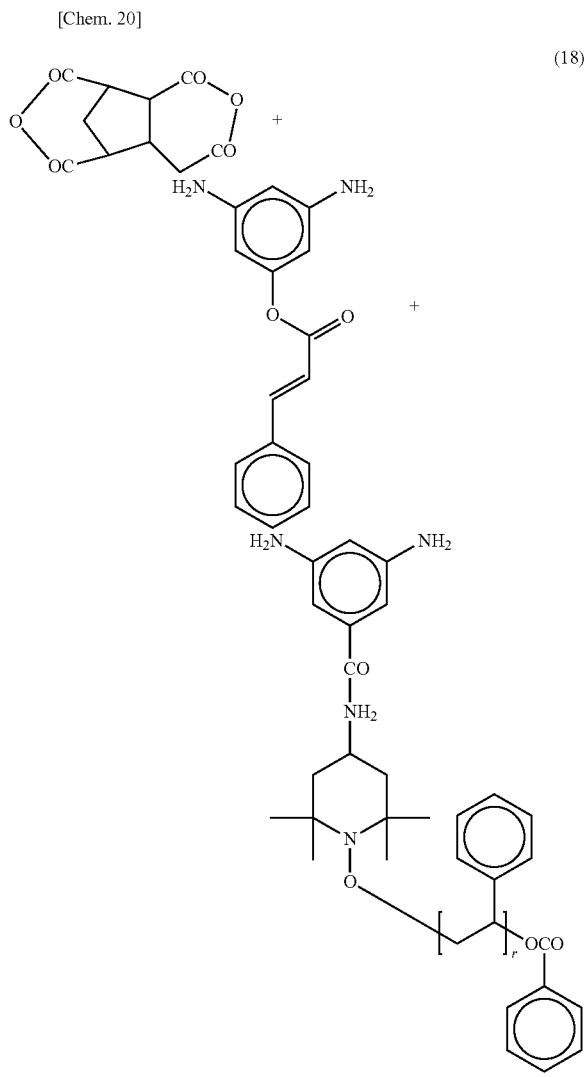

(18)

(wherein r represents the number of the repeated unit within the brackets, and is a positive integer.)
tetracarboxylic anhydride, the diamine monomer including the repeated structure as the second monomer unit (the compound obtained in the third step), and the diamine monomer containing the photoreactive functional group as the first monomer unit (the compound obtained in the fifth step) were dissolved in a solvent such as N-methylpyrrolidone in a predetermined molar ratio, and the solution was heated at approximately 60° C. to synthesize the polyimide copolymer represented by the formula (12).

After the synthesis, a monomer or a low molecular weight oligomer can be removed by operation of dissolution and reprecipitation to synthesize a polyamic acid (copolymer) having an imidization ratio of 0%. The dissolution and reprecipitation can be performed, for example, using methyl alcohol as a poor solvent and N-methylpyrrolidone as a good solvent.

In the present Example, a plurality of samples was prepared in which the composition ratio of the monomer unit including the grafted side chain, represented by m in the formula (12), was varied in the range of 0 to 1. The repeated unit (r) of the grafted side chain unit was adjusted such that the molecular weight of the grafted side chain was approximately 1000 (r=10).

Namely, in Example 1, in the samples in which the molecule number (the repetition number r) of the grafted side chain was fixed, and the ratio m of the grafted side chain to be introduced into the copolymer was varied, the response properties and the image sticking ratios were measured, and compared. The result is shown in Table 1. r was determined as follows: the side chain was dissociated by an acid or an alkali, and recovered, and subjected to GPC measurement.

TABLE 1

| Sample numbers | 1 | 2 | 3 | 4 | 5 | 6 |
|---|---|---|---|---|---|---|
| m | 0 | 0.2 | 0.4 | 0.6 | 0.8 | 1 |
| r | non | 10 | 10 | 10 | 10 | 10 |
| Response time (msec) 10%→90% | 17.7 | 9.3 | 7.8 | 25.6 | >100 | no response |
| Response time (msec) 90%→10% | 8.6 | 7.2 | 6.8 | 13.3 | >100 | no response |
| Image sticking ratios (%) | 15 | 6 | 3 | 2.5 | 2.5 | unevaluable |

Of Samples 1 to 6, Samples 2 to 5 correspond to the alignment film in the present invention. Apparently from Table 1, in Samples 2 to 5, the image sticking ratio is reduced much more than that in Sample 1.

The image sticking ratio (a) was determined as follows: a black and white checker pattern was displayed for 48 hours, and a halftone (gray) was displayed all over the display region; then, the difference (b−g) between the brightness (b) of the region in which white was displayed and the brightness (g) of the region in which black was displayed was divided by the brightness g of the region in which black was displayed:

$a=((b-g)/g)\times 100(\%)$

The image sticking ratio was reduced as m was increased. It is thought that this is because of reduction in the density of the pretilt angle demonstrating component which it is thought leads to change in the pretilt angle by conduction of AC voltage, or reduction in the density of impurity ions adsorbed by the surface of the alignment film due to an influence of DC voltage.

The response properties showed a tendency as follows: in both the rise time (transmittance from 10 to 90%) and the fall time (transmittance from 90 to 100), the response time is shortened as m is increased in the range of 40% or less, and the response time is increased when m is in the range more than 40%. For the reason that the response time is shortened when m is in the range of not more than 40%, it is thought that presence of the grafted side chain suppresses the fluctuation of the azimuthal angle of the liquid crystal molecules in a bulk liquid crystal layer, and the anchoring strength in the surface of the alignment film is increased. When m is more than 40%, it is thought that the proportion of the side chain that contributes to demonstration of the pretilt angle is reduced, and the pretilt angle is close to 90°, resulting in increase in the response time. At m of 100%, there is no pretilt angle demonstrating function, and the pretilt angle is 90°. Accordingly, the liquid crystal molecules did not response even if voltage was applied.

As above, it turns out that optimization of m can reduce the occurrence of the image sticking, and further improve the response time. The optimal value of m varies depending on the kind of the photoreactive functional group in the first monomer unit or the difference of other structure.

Example 2

Example 2 will be shown below in which a liquid-crystal display device was produced according to the liquid-crystal display device according to Embodiment 1. In Example 2, a plurality of samples was produced in the same manner as in Example 1 except that the composition ratio (m) of the second monomer unit including the grafted side chain was fixed at 0.2, and the repeated unit (r) of the grafted side chain unit was adjusted such that the weight average molecular weight of the whole grafted side chain was in the range of 500 to 5000.

Namely, in Example 2, the response properties and the image sticking ratios were measured when the ratio of the grafted side chain to be introduced into the copolymer was fixed, and the polymerization degree r of the grafted side chain unit was varied, and compared. The result is shown in Table 2.

TABLE 2

| Sample numbers | 7 | 8 | 9 | 10 | 11 | 12 |
|---|---|---|---|---|---|---|
| m | 0.2 | 0.2 | 0.2 | 0.2 | 0.2 | 0.2 |
| r | 5 | 10 | 20 | 30 | 40 | 50 |
| Response time (msec) 10%→90% | 14.2 | 9.3 | 7.9 | 7.6 | 7.5 | 7.5 |
| Response time (msec) 90%→10% | 9.8 | 7.2 | 7.1 | 7.1 | 7.2 | 6.9 |
| Image sticking ratios (%) | 15 | 6 | 2.5 | 2.5 | 2.5 | 2.5 |

Of Samples 7 to 12 above, Samples 8 to 12 correspond to the alignment film included in the liquid-crystal display device according to the present invention. Apparently from Table 2, in Samples 8 to 12, the image sticking ratio is reduced much more than that in Sample 7.

The image sticking ratio was reduced as r was increased. It is thought that this is because the anchoring strength increased along with increase in r prevented the surface of the alignment film from adsorbing impurities to suppress change in the tilt angle or increase of rDC.

The response properties showed a tendency as follows: the rise time (transmittance from 10 to 90%) and the fall time (transmittance from 90 to 10%) are remarkably reduced when r is in the range of 20 or less, and mildly reduced when r is more than 20. It is thought that this is because increase in r can effectively suppress the fluctuation of the azimuthal angle of the liquid crystal molecule in the bulk liquid crystal layer to improve the response properties. Moreover, increase in the anchoring strength of the surface of the alignment film is thought as one of factors.

As above, it turns out that if r is not less than 10, namely, the weight average molecular weight of the side chain is not less than 1000, the occurrence of the image sticking can be reduced, and further the response time can be effectively improved.

Example 3

Example 3 will be shown below in which a liquid-crystal display device was produced according to the liquid-crystal display device according to Embodiment 1.

The alignment film in Example 3 is the same alignment film as that in Example 1 except that a group of atoms that forms a crosslinking structure by a photoreaction is introduced into the second monomer unit including the grafted side chain, and liquid crystal alignment properties are given by a photo dimerization reaction.

An alignment film comprising a copolymer was formed on each of the substrates in the pair comprising an electrode, the copolymer being produced using a first monomer including a cinnamate group and represented by the formula (3-1) as the photoreactive functional group and a second monomer including the group of atoms represented by the formula (1-5) as the repeated unit in which a group of atoms including a cinnamate group was added to the group of atoms represented by the formula (6-4) between the main chain and the repeated structure. The polymer compound formed in Example 3, which forms the alignment film, is polyimide represented by the following formula (19):

[Chem. 21]

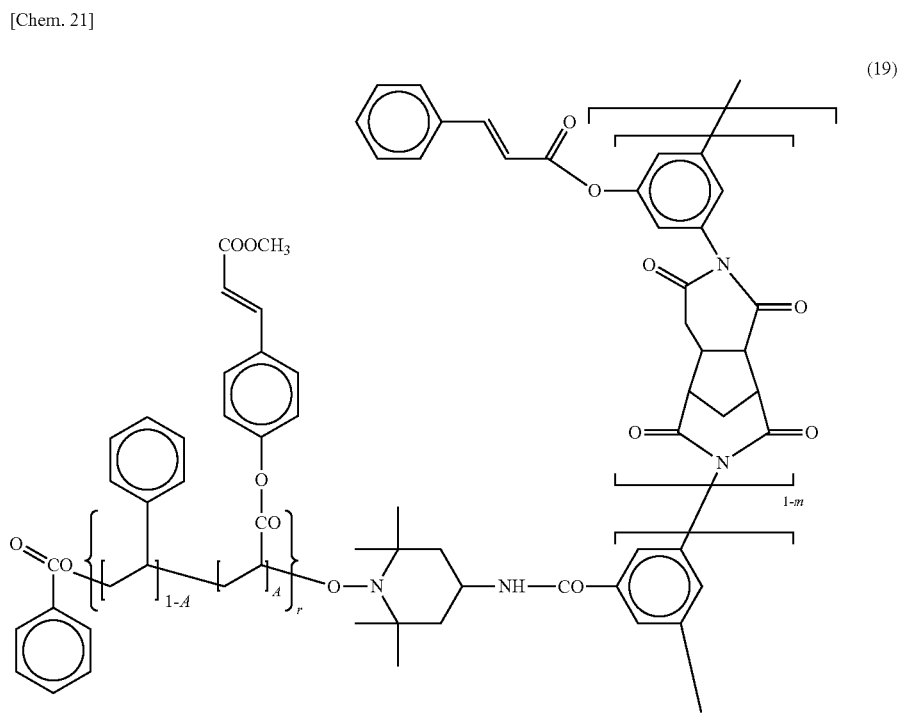

(19)

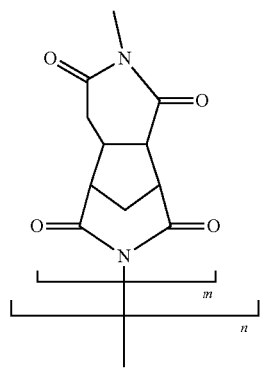

(wherein A represents the composition ratio of the repeated unit in the side chain, and is any value of 0 to 1; m represents a composition ratio of the monomer unit in the copolymer, and is any value of 0 to 1; and r represents the number of the repeated unit within the brackets, and is a positive integer.).

The alignment film was formed using spin coating while the concentration and the number of rotation were adjusted such that the film thickness was 50 to 60 nm. Other film forming method such as a printing method and an ink-jet method can also be used.

After film formation, prebaking was performed, followed by postbaking. Next, the alignment film was subjected to an aligning treatment by irradiating the surface of the alignment film with polarized UV light from an oblique direction such that the alignment film had properties such that the pretilt angle to be given to the liquid crystal molecules was not less than 86° and less than 90°. Subsequently, a sealing material was applied to one of the substrates, and beads were spread on the other substrate. Then, the one substrate was applied to the other such that the one alignment orientation of the liquid crystal molecules in the vicinity of the alignment film perpendicularly intersected the other alignment orientation thereof. A liquid crystal material showing negative dielectric anisotropy was injected between the pair of substrates to produce a liquid crystal panel. As the liquid crystal material, MLC-6608 (made by Merck KGaA) was used.

The grafted side chain of the polymer compound represented by the formula (19) was synthesized by a living radical polymerization in order to reduce weight average molecular weight distribution. Specifically, according to the chemical equation (20), a portion of a second monomer unit in the polymer compound represented by the formula (19) was synthesized.

First, the first step and the second step were performed by the same method as that in Example 1.

Subsequently, as the third step, as shown in the chemical equation (20):

[Chem. 22]

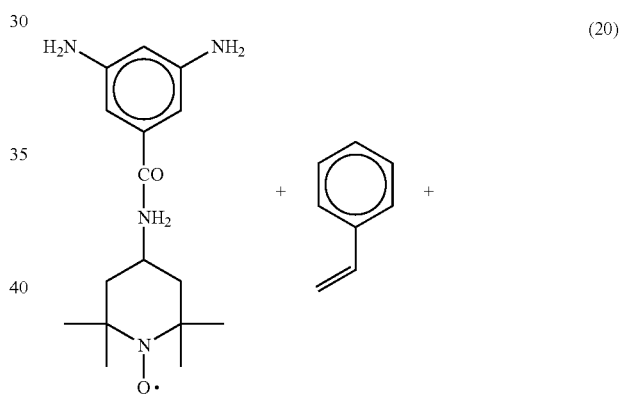

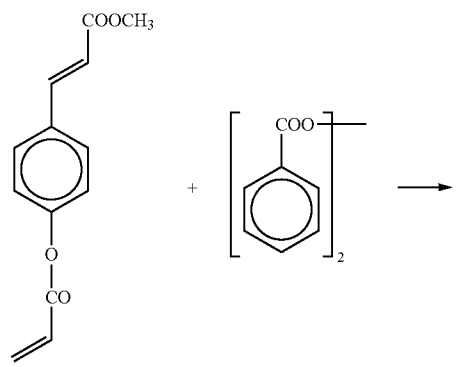

(20)

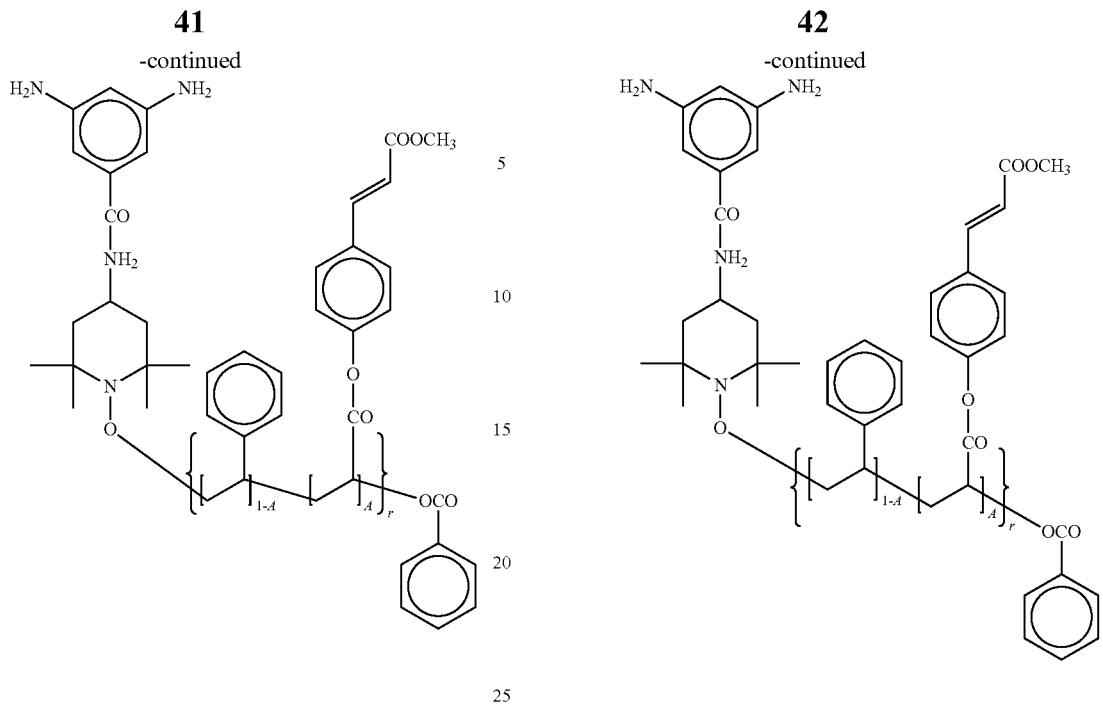

(wherein A represents the composition ratio of the repeated unit in the side chain, and is any value of 0 to 1; and r represents the number of the repeated unit within the brackets, and is a positive integer.)

styrene, cinnamate, and benzoic anhydride were added to the compound obtained in the second step, mixed, and stirred. The cinnamate group is the photoreactive functional group represented by the formula (3-1). Thereby, the diamine monomer including the repeated structure as the second monomer unit can be synthesized.

Subsequently, the fifth step and the sixth step were performed to synthesize a diamine monomer containing a photoreactive functional group that is the first monomer unit represented by the formula (19).

Subsequently, as shown in the chemical equation (21):

[Chem. 23]

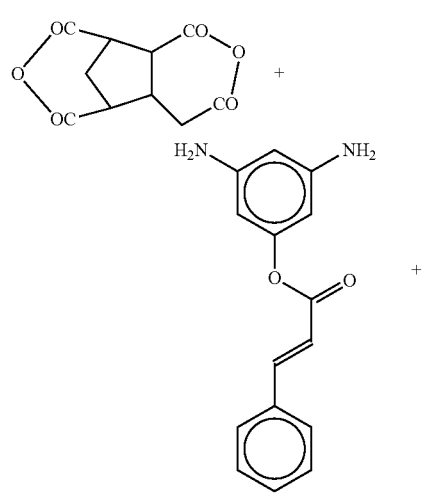

(21)

(wherein A represents the composition ratio of the repeated unit in the side chain, and is any value of 0 to 1; r represents the number of the repeated unit of the group of atoms within the brackets, and is a positive integer.)

tetracarboxylic anhydride, the diamine monomer including the repeated structure as the second monomer unit (the compound obtained in the third step), and the diamine monomer containing a photoreactive functional group (compound obtained in the fifth step) as the first monomer unit were dissolved in a solvent such as N-methylpyrrolidone in a predetermined molar ratio, and the solution was heated to approximately 60° C. to synthesize a polyimide copolymer represented by the formula (19).

After the synthesis, a monomer or a low molecular weight oligomer can be removed by operation of dissolution and reprecipitation to synthesize a polyamic acid (copolymer) having an imidization ratio of 0%. The dissolution and reprecipitation can be performed, for example, using methyl alcohol as a poor solvent and N-methylpyrrolidone as a good solvent.

In the present Example, a plurality of samples was produced in which the composition ratio of the monomer unit including the grafted side chain represented by m in the formula (19) was fixed at 0.2, the repeated unit (r) of the grafted side chain unit was fixed at 20, and A was adjusted in the range of 0 to 1 such that the molecular weight of the grafted side chain was 2000 to 5000.

Namely, in Example 3, when the ratio of the grafted side chain to be introduced into the copolymer was fixed, the polymerization degree r of the grafted side chain unit was fixed, and the composition ratio of A in the repeated unit in the grafted side chain was varied, the response properties and the image sticking ratios were measured, and compared. The result is shown in Table 3.

TABLE 3

| Sample numbers | 13 | 14 | 15 | 16 | 17 | 18 |
|---|---|---|---|---|---|---|
| m | 0.2 | 0.2 | 0.2 | 0.2 | 0.2 | 0.2 |
| r | 20 | 20 | 20 | 20 | 20 | 20 |
| A | 0 | 0.2 | 0.4 | 0.6 | 0.8 | 1 |
| Response time (msec) 10%→90% | 7.9 | 7.4 | 6.3 | 6.2 | 6.2 | 6.1 |
| Response time (msec) 90%→10% | 7.1 | 7.1 | 6.9 | 6.8 | 6.4 | 6.2 |
| Image sticking ratios (%) | 2.5 | 2.5 | 2.5 | 2.0 | 2.0 | 2.0 |

Of Samples 13 to 18, Samples 13 to 18 all correspond to the alignment film included in the liquid-crystal display device according to the present invention. Apparently from Table 3, in all of the Samples 13 to 18, the image sticking ratio is significantly reduced.

The image sticking ratio is reduced as A is increased. It is thought that increase of A leads to increase in the crosslinking density of the grafted side chain, and as a result, change in the tilt angle or increase in rDC is suppressed.

The response properties showed a tendency as follows: both the rise time (transmittance from 10 to 90%) and the fall time (transmittance from 90 to 10%) are mildly reduced when A is in the range of 0.2 or less, and more mildly reduced when A is more than 0.4. It is thought that this is because if the ratio A of the photoreactive functional group in the grafted side chain is increased, fluctuation in the azimuthal angle of the liquid crystal molecules in a bulk liquid crystal layer can be more effectively suppressed to improve the response properties. Moreover, increase in the anchoring strength of the surface of the alignment film is thought as one of factors.

As above, it turns out that optimization of the value of A enables reduction in the occurrence of the image sticking and improvement in the response time. The optimal value of A varies depending on the kind of the photoreactive functional group in the first monomer unit and the difference of other structure.

Example 4

Example 4 will be shown below in which a liquid-crystal display device was produced according to the liquid-crystal display device according to Embodiment 5.

An alignment film comprising a copolymer was formed on each of the substrates in the pair comprising an electrode, the copolymer being produced using a first monomer including a cinnamate group and represented by the formula (3-1) as the photoreactive functional group and a second polymer including the group of atoms represented by the formula (1-5) as the repeated unit and the group of atoms represented by the formula (6-4) between the main chain and the repeated structure. The polymer compound formed in Example 4, which forms the alignment film, is polyvinyl represented by the following formula (22):

[Chem. 24]

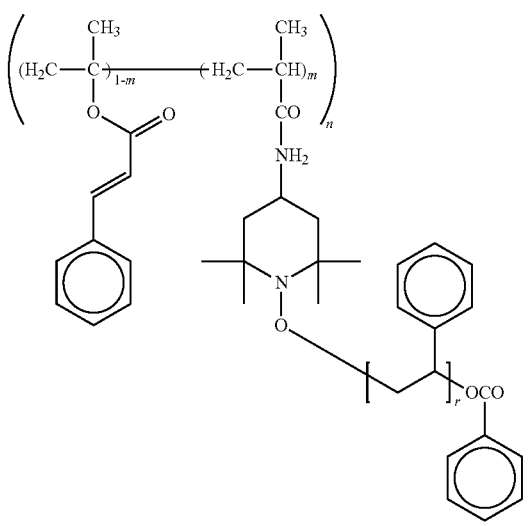

(22)

(wherein m represents a composition ratio of the monomer unit in the copolymer, and is any value of 0 to 1; and n and r represent the number of the repeated unit within the brackets, and are a positive integer.).

The alignment film was formed using spin coating while the concentration and the number of rotation were adjusted such that the film thickness was 50 to 60 nm. Other film forming method such as a printing method and an ink-jet method can also be used.

After film formation, prebaking was performed, followed by postbaking. Next, the alignment film was subjected to an aligning treatment by irradiating the surface of the alignment film with polarized UV light from an oblique direction such that the alignment film had properties such that the pretilt angle to be given to the liquid crystal molecules was not less than 86° and less than 90°. Subsequently, a sealing material was applied to one of the substrates, and beads were spread on the other substrate. Then, the one substrate was applied to the other such that the one alignment orientation of the liquid crystal molecules in the vicinity of the alignment film perpendicularly intersected the other alignment orientation thereof. A liquid crystal material showing negative dielectric anisotropy was injected between the pair of substrates to produce a liquid crystal panel. As the liquid crystal material, MLC-6608 (made by Merck KGaA) was used.

The grafted side chain of the polymer compound represented by the formula (22) was synthesized by a living radical polymerization in order to reduce weight average molecular weight distribution. Specifically, a portion of a second monomer unit in the polymer compound represented by the formula (22) was synthesized using the same method as that in Example 1 except that a vinyl structure was used instead of the imide structure precursor.

In Example 4, as shown in the chemical equation (23):

[Chem. 25]

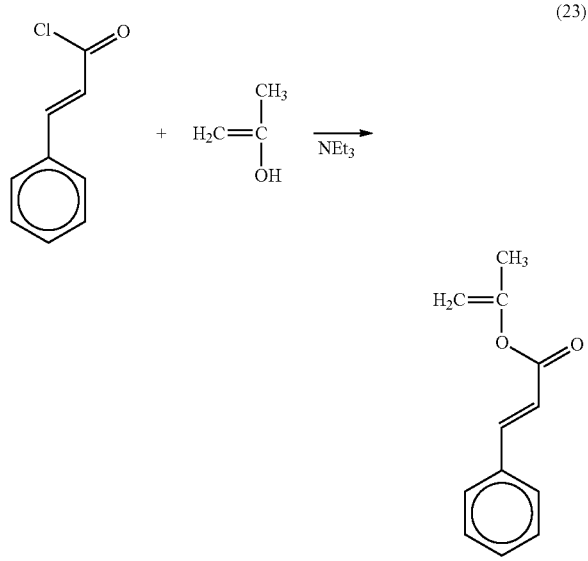

cinnamoyl chloride was dropped to a toluene solution containing methyl vinyl alcohol and triethylamine, and the solution was heated at approximately 40° C. to obtain a cinnamate containing vinyl monomer. In the chemical equation (23), an example is shown in which the cinnamoyl group is used as the photoreactive functional group. Other photoreactive functional group represented by the formulas (3-1) to (3-6) may be used.

Subsequently, as shown in the chemical equation (24):

[Chem. 26]

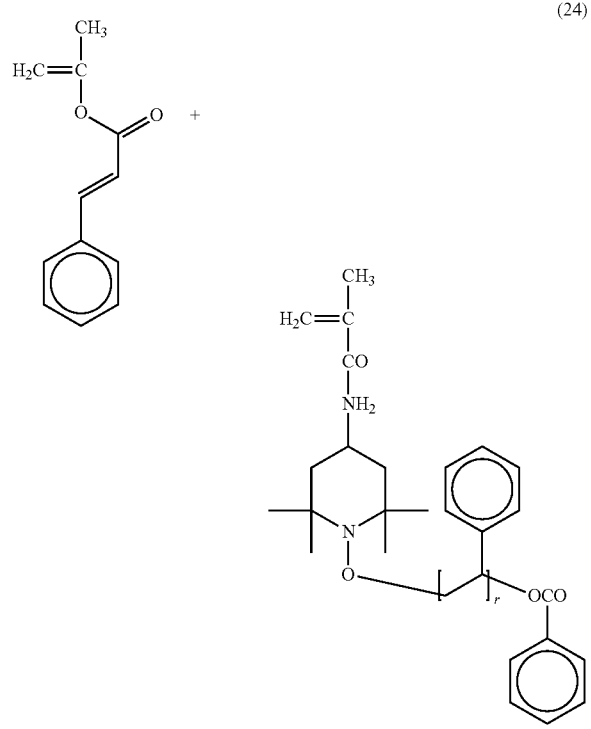

(wherein r represents the number of the repeated unit within the brackets, and is a positive integer.)

the second monomer unit, i.e., the vinyl monomer including the repeated structure and the first monomer unit, i.e., the vinyl monomer containing the photoreactive functional group were dissolved in a solvent such as toluene in a predetermined molar ratio, an initiator was added to the solution at a concentration of approximately $1/100$ to the total monomers, and the solution was heated at approximately 60° C. to perform a radical polymerization. Thus, the polyvinyl copolymer represented by the formula (22) was synthesized.

After the synthesis, a monomer or a low molecular weight oligomer can be removed by operation of dissolution and reprecipitation. In the dissolution and reprecipitation, toluene is suitable for a good solvent, and ether is suitable for a poor solvent.

In the present Example, a plurality of samples was prepared in which the composition ratio m of the monomer unit including the grafted side chain in the formula (22) was varied in the range of 0 to 1. The repeated unit (r) of the grafted side chain unit was adjusted such that the molecular weight of the grafted side chain was approximately 1000 (r=10).

Namely, in Example 4, in the samples in which the molecular number (repetition number r) of the grafted side chain was fixed, and the ratio m of the grafted side chain to be introduced into the copolymer was varied, the response properties and the image sticking ratios were measured, and compared. The result is shown in Table 4. r was determined as follows: the side chain was dissociated by an acid or an alkali, and recovered, and subjected to GPC measurement.

TABLE 4

| Sample numbers | 19 | 20 | 21 | 22 | 23 | 24 |
|---|---|---|---|---|---|---|
| m | 0 | 0.2 | 0.4 | 0.6 | 0.8 | 1 |
| r | non | 10 | 10 | 10 | 10 | 10 |
| Response time (msec) 10%→90% | 35.7 | 20.1 | 16.0 | 19.7 | >50 | no response |
| Response time (msec) 90%→10% | 12.9 | 9.3 | 8.1 | 9.6 | >50 | no response |
| Image sticking ratios (%) | 25 | 10 | 5 | 4.5 | 4 | unevaluable |

Of Samples 19 to 24, Samples 20 to 23 correspond to the alignment film included in the liquid-crystal display device according to the present invention. Apparently from Table 4, in Samples 20 to 23, the image sticking ratio is reduced much more than in Sample 19.

The image sticking ratio is reduced as m is increased. It is thought that this is because of reduction in the density of the pretilt angle demonstrating component which it is thought leads to change in the tilt angle by conduction of AC voltage, or reduction in the density of impurity ions adsorbed by the surface of the alignment film due to an influence of DC voltage.

The response properties showed a tendency as follows: in both the rise time (transmittance from 10 to 90%) and the fall time (transmittance from 90 to 10%), the response time is shortened as m is increased in the range of 40% or less, and the response time is increased when m is in the range more than 40%. For the reason that the response time is shortened when m is in the range of not more than 40%, it is thought that presence of the grafted side chain suppresses the fluctuation of the azimuthal angle of the liquid crystal molecules in a bulk liquid crystal layer, and the anchoring strength in the surface of the alignment film is increased. When m is more than 40%, it is thought that the proportion of the side chain that contributes to demonstration of the pretilt angle is reduced, and the pretilt angle is close to 90°, resulting in increase in the response time. At m of 100%, there is no pretilt angle demonstrating function, and the pretilt angle is 90°. Accordingly, the liquid crystal molecules did not response even if voltage was applied.

As above, it turns out that optimization of m can reduce the occurrence of the image sticking, and further improve the response time. The optimal value of m varies depending on the kind of the photoreactive functional group in the first monomer unit or the difference of other structure.

The present application claims priority to Patent Application No. 2010-034011 filed in Japan on Feb. 18, 2010 under the Paris Convention and provisions of national law in a designated State, the entire contents of which are hereby incorporated by reference.

REFERENCE SIGNS LIST

1, 101, 201: Support
2, 102, 202: Liquid crystal molecule
3, 103, 203: Alignment film
3a, 103a, 203a: Main chain
3b, 103b: First side chain
3c, 203c: Second side chain (grafted side chain)
4, 104, 204: Electrode
5, 105, 205: Liquid crystal layer
11, 111, 211: Substrate (active matrix substrate)
12, 112, 212: Substrate (color filter substrate)

The invention claimed is:

1. A liquid-crystal display device comprising a pair of substrates each comprising an electrode and a photoalignment film, and a liquid crystal layer interposed between the pair of substrates, wherein the photoalignment film comprises a copolymer comprising a first monomer unit including a first side chain including a photoreactive functional group and a second monomer unit including a second side chain including a repeated structure, and the repeated structure is represented by the following formula (I),

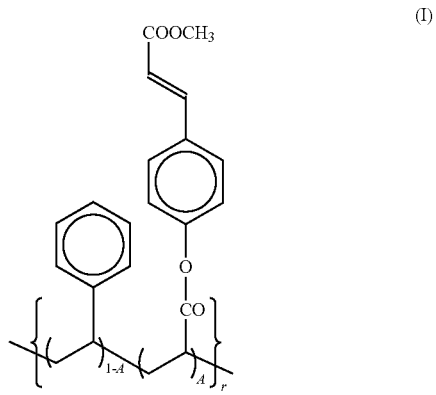

wherein A represents the composition ratio of the repeated unit of the repeated structure in the second side chain, and is any value of 0 to 1; and r represents the number of the repeated structure within the brackets, and is a positive integer equal to or greater than 10;

wherein the macromolecular main chain of the copolymer is polyimide, or polyamic acid;

wherein the copolymer includes a chemical structure represented by the following formula (III),

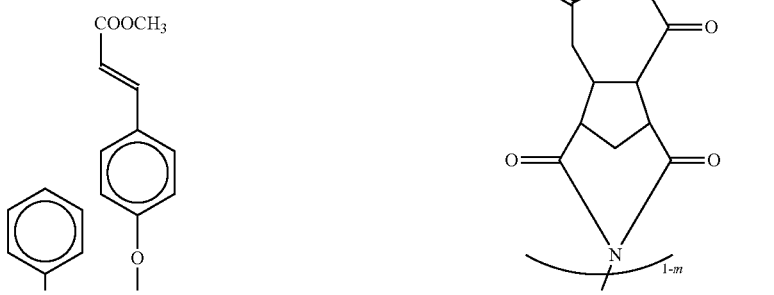

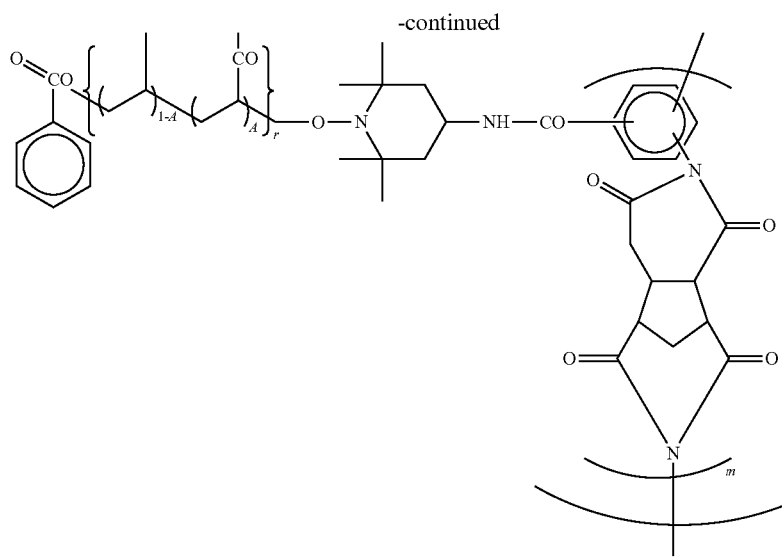

wherein T represents the photoreactive functional group included in the first side chain of the first monomer unit; A represents the composition ratio of the repeated unit of the repeated structure in the second side chain of the second monomer unit, and is any value of 0 to 1; m represents the composition ratio of the second monomer unit in the copolymer, and is 0.2; r represents the number of the repeated structure within the brackets, and is a positive integer equal to or greater than 10; and n represents the polymerization degree, and is a positive integer.

2. A liquid-crystal display device comprising a pair of substrates each comprising an electrode and a photoalignment film, and a liquid crystal layer interposed between the pair of substrates,
wherein the photoalignment film comprises a copolymer comprising a first monomer unit including a first side chain including a photoreactive functional group and a second monomer unit including a second side chain including a repeated structure, and the repeated structure is represented by the following formula (I):

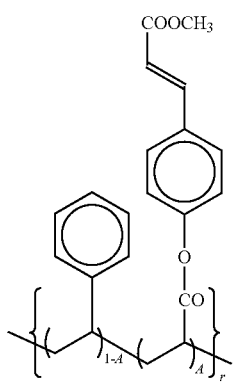

(I)

wherein A represents the composition ratio of the repeated unit of the repeated structure in the second side chain, and is any value of 0 to 1; and r represents the number of the repeated structure within the brackets, and is a positive integer equal to or greater than 10;
wherein the macromolecular main chain of the copolymer is polyvinyl;
wherein the copolymer includes a chemical structure represented by the following formula (IV):

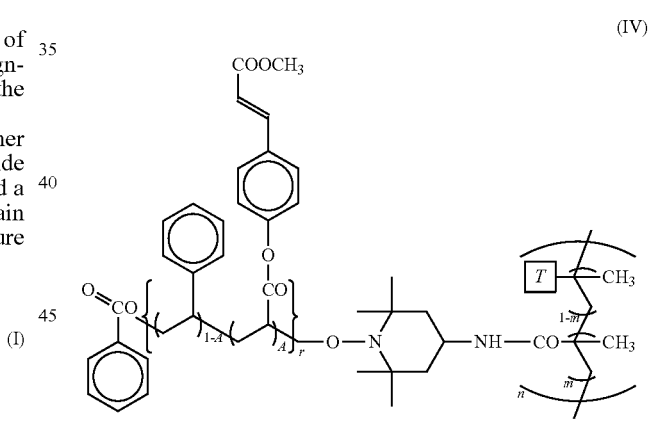

(IV)

wherein T represents the photoreactive functional group included in the first side chain of the first monomer unit; A represents the composition ratio of the repeated unit of the repeated structure in the second side chain of the second monomer unit, and is any value of 0 to 1; m represents the composition ratio of the second monomer unit in the copolymer, and is in a range of 0.4 to 0.6; r represents the number of the repeated structure within the brackets, and is a positive integer equal to or greater than 10; and n represents the polymerization degree, and is a positive integer.

* * * * *